US009383206B2

(12) United States Patent
Kimchi et al.

(10) Patent No.: US 9,383,206 B2
(45) Date of Patent: Jul. 5, 2016

(54) OBTAINING AND DISPLAYING VIRTUAL EARTH IMAGES

(71) Applicant: Microsoft Technology Licensing, LLC, Redmond, WA (US)

(72) Inventors: Gur Kimchi, Bellevue, WA (US); Amit Dekate, Medina, WA (US); Ashok Kuppusamy, Seattle, WA (US); Steve Lombardi, Seattle, WA (US); Joseph Schwartz, Redmond, WA (US); Stephen L. Lawler, Redmond, WA (US); Alexander G. Gounares, Kirkland, WA (US); Raymond E. Endres, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 14/191,092

(22) Filed: Feb. 26, 2014

(65) Prior Publication Data

US 2014/0180571 A1    Jun. 26, 2014

Related U.S. Application Data

(63) Continuation of application No. 11/246,774, filed on Oct. 7, 2005, now Pat. No. 8,850,011.

(60) Provisional application No. 60/673,442, filed on Apr. 21, 2005.

(51) Int. Cl.
*G06F 15/173* (2006.01)
*G01C 21/00* (2006.01)
(Continued)

(52) U.S. Cl.
CPC ............... *G01C 21/00* (2013.01); *G01C 21/26* (2013.01); *G06F 17/30241* (2013.01);
(Continued)

(58) Field of Classification Search
None
See application file for complete search history.

(56) References Cited

U.S. PATENT DOCUMENTS

| 4,352,334 A | 10/1982 | Childs et al. |
| 4,475,239 A | 10/1984 | van Raamsdonk |

(Continued)

FOREIGN PATENT DOCUMENTS

| DE | 43 12 583 | 11/1994 |
| EP | 0 897 170 A2 | 2/1999 |

(Continued)

OTHER PUBLICATIONS

U.S. Appl. No. 12/275,970, filed Nov. 21, 2008 entitled "Virtual Earth Rooftop Overlay and Bounding".

(Continued)

*Primary Examiner* — Kenny Lin
(74) *Attorney, Agent, or Firm* — Tom Wong; Steven Spellman; Micky Minhas

(57) ABSTRACT

Provided is a single repository for capturing, connecting, sharing, and visualizing information based on a geographic location, for example. Provided is a schema, repository, index, and APIs for any information, place, entity, attribute, service or person that can be referenced geographically. A system to provide real time image data includes an input component that receives image data associated with a specific geographic area, a splitter component that splits the image data into at least two quadrants, and a storage component that stores at least a portion of the at least two quadrants. Also provides is on-line or real-time advertising based on a user's mapped location and/or a user preference.

20 Claims, 23 Drawing Sheets

(51) Int. Cl.

| | | |
|---|---|---|
| *G01C 21/26* | (2006.01) | |
| *G06F 17/30* | (2006.01) | |
| *G06Q 30/02* | (2012.01) | |
| *G08G 1/0962* | (2006.01) | |
| *G08G 1/0969* | (2006.01) | |
| *G09B 29/00* | (2006.01) | |
| *G09B 29/10* | (2006.01) | |

(52) U.S. Cl.
CPC .......... *G06Q 30/02* (2013.01); *G06Q 30/0253* (2013.01); *G06Q 30/0275* (2013.01); *G06Q 30/0277* (2013.01); *G08G 1/0962* (2013.01); *G08G 1/0969* (2013.01); *G09B 29/007* (2013.01); *G09B 29/106* (2013.01)

(56) References Cited

U.S. PATENT DOCUMENTS

| | | |
|---|---|---|
| 5,438,662 A | 8/1995 | Randall |
| 5,602,564 A | 2/1997 | Iwamura et al. |
| 5,630,080 A | 5/1997 | Malamud et al. |
| 5,652,717 A | 7/1997 | Miller et al. |
| 5,666,552 A | 9/1997 | Greyson et al. |
| 5,721,679 A | 2/1998 | Monson |
| 5,751,576 A | 5/1998 | Monson |
| 5,917,898 A | 6/1999 | Bassa et al. |
| 5,940,078 A | 8/1999 | Nagarajayya et al. |
| 5,945,976 A | 8/1999 | Iwamura et al. |
| 5,948,040 A | 9/1999 | DeLorme et al. |
| 5,999,892 A | 12/1999 | Fan |
| 6,011,553 A | 1/2000 | Komiyama |
| 6,041,335 A | 3/2000 | Merritt et al. |
| 6,067,502 A | 5/2000 | Hayashida et al. |
| 6,092,076 A | 7/2000 | McDonough et al. |
| 6,100,896 A | 8/2000 | Strohecker et al. |
| 6,100,897 A | 8/2000 | Mayer et al. |
| 6,101,498 A | 8/2000 | Scaer et al. |
| 6,144,318 A | 11/2000 | Hayashi et al. |
| 6,150,961 A | 11/2000 | Alewine et al. |
| 6,163,749 A | 12/2000 | McDonough et al. |
| 6,175,802 B1 | 1/2001 | Okude et al. |
| 6,240,360 B1 | 5/2001 | Phelan |
| 6,275,824 B1 | 8/2001 | O'Flaherty et al. |
| 6,314,370 B1 | 11/2001 | Curtright |
| 6,317,718 B1 | 11/2001 | Fano |
| 6,356,835 B2 | 3/2002 | Hayashi et al. |
| 6,369,720 B1 | 4/2002 | Wilhelm |
| 6,392,667 B1 | 5/2002 | McKinnon et al. |
| 6,452,544 B1 | 9/2002 | Hakala et al. |
| 6,480,885 B1 | 11/2002 | Olivier |
| 6,496,209 B2 | 12/2002 | Horii |
| 6,563,514 B1 | 5/2003 | Samar |
| 6,571,279 B1 | 5/2003 | Herz et al. |
| 6,594,076 B2 | 7/2003 | Satou |
| 6,594,576 B2 | 7/2003 | Fan et al. |
| 6,629,136 B1 | 9/2003 | Naidoo |
| 6,641,507 B1 | 11/2003 | Warner et al. |
| 6,694,249 B1 | 2/2004 | Anderson et al. |
| 6,711,493 B1 | 3/2004 | Andrews et al. |
| 6,772,142 B1 | 8/2004 | Kelling et al. |
| 6,845,318 B1 | 1/2005 | Moore et al. |
| 6,853,383 B2 | 2/2005 | Duquesnois |
| 6,912,462 B2 | 6/2005 | Ogaki |
| 6,938,220 B1 | 8/2005 | Shigematsu et al. |
| 6,954,543 B2 | 10/2005 | Svendsen et al. |
| 7,028,256 B2 | 4/2006 | Altman et al. |
| 7,071,842 B1 | 7/2006 | Brady, Jr. |
| 7,080,139 B1 | 7/2006 | Briggs et al. |
| 7,095,905 B1 | 8/2006 | Peterson |
| 7,096,233 B2 | 8/2006 | Mori et al. |
| 7,098,435 B2 | 8/2006 | Mueller et al. |
| 7,098,909 B2 | 8/2006 | Hayano et al. |
| 7,106,219 B2 | 9/2006 | Pearce |
| 7,126,630 B1 | 10/2006 | Lee et al. |
| 7,130,865 B2 | 10/2006 | Moore |
| 7,134,095 B1 | 11/2006 | Smith et al. |
| 7,158,878 B2 | 1/2007 | Rasmussen et al. |
| 7,161,504 B2 | 1/2007 | Linn |
| 7,181,523 B2 | 2/2007 | Sim |
| 7,188,025 B2 | 3/2007 | Hudson, Jr. |
| 7,218,227 B2 | 5/2007 | Davis et al. |
| 7,221,376 B2 | 5/2007 | Iwema et al. |
| 7,289,904 B2 | 10/2007 | Uyeki |
| 7,324,666 B2 | 1/2008 | Zoken et al. |
| 7,328,201 B2 | 2/2008 | D'Ambrosio |
| 7,337,185 B2 | 2/2008 | Ellis et al. |
| 7,340,077 B2 | 3/2008 | Gokturk |
| 7,376,640 B1 | 5/2008 | Anderson et al. |
| 7,388,519 B1* | 6/2008 | Kreft .................. G06Q 10/047 340/995.1 |
| 7,395,316 B2 | 7/2008 | Ostertag et al. |
| 7,403,993 B2 | 7/2008 | John et al. |
| 7,420,476 B2 | 9/2008 | Stiffler |
| 7,437,221 B2 | 10/2008 | Hardman et al. |
| 7,466,244 B2 | 12/2008 | Kimchi et al. |
| 7,564,377 B2 | 7/2009 | Kimchi et al. |
| 7,570,261 B1 | 8/2009 | Edecker et al. |
| 7,630,883 B2 | 12/2009 | Sato |
| 7,688,227 B1 | 3/2010 | Tosun |
| 7,777,648 B2 | 8/2010 | Smith et al. |
| 7,920,072 B2 | 4/2011 | Smith et al. |
| 7,961,979 B2 | 6/2011 | Van Den Heuvel et al. |
| 8,055,579 B2 | 11/2011 | Davies et al. |
| 8,078,396 B2 | 12/2011 | Meadow et al. |
| 8,103,445 B2 | 1/2012 | Smith et al. |
| 8,319,618 B2 | 11/2012 | Gomi et al. |
| 8,593,486 B2 | 11/2013 | Kodaira et al. |
| 8,666,657 B2 | 3/2014 | Meadow et al. |
| 2001/0014185 A1 | 8/2001 | Chitradon et al. |
| 2001/0028348 A1 | 10/2001 | Higgins et al. |
| 2001/0034588 A1 | 10/2001 | Agrawals et al. |
| 2002/0010757 A1 | 1/2002 | Granik et al. |
| 2002/0029226 A1 | 3/2002 | Li et al. |
| 2002/0035609 A1 | 3/2002 | Lessard et al. |
| 2002/0042819 A1 | 4/2002 | Reichert et al. |
| 2002/0049534 A1 | 4/2002 | Yuda et al. |
| 2002/0049742 A1 | 4/2002 | Chan et al. |
| 2002/0065605 A1* | 5/2002 | Yokota ............... G01C 21/3682 701/438 |
| 2002/0067353 A1 | 6/2002 | Kenyon et al. |
| 2002/0070981 A1 | 6/2002 | Kida |
| 2002/0083018 A1 | 6/2002 | Carroll et al. |
| 2002/0083118 A1 | 6/2002 | Sim |
| 2002/0087797 A1 | 7/2002 | Adrangi |
| 2002/0091568 A1 | 7/2002 | Kraft et al. |
| 2002/0094868 A1 | 7/2002 | Tuck et al. |
| 2002/0121989 A1 | 9/2002 | Burns |
| 2002/0122564 A1 | 9/2002 | Rhoads et al. |
| 2002/0123841 A1 | 9/2002 | Satoh et al. |
| 2002/0124024 A1 | 9/2002 | Patterson et al. |
| 2002/0154174 A1 | 10/2002 | Redlich et al. |
| 2002/0163547 A1 | 11/2002 | Abramson et al. |
| 2003/0025599 A1 | 2/2003 | Monroe |
| 2003/0030636 A1 | 2/2003 | Yamaoka |
| 2003/0036848 A1 | 2/2003 | Sheha et al. |
| 2003/0046161 A1 | 3/2003 | Kamangar et al. |
| 2003/0061101 A1 | 3/2003 | Seet et al. |
| 2003/0061211 A1 | 3/2003 | Shultz et al. |
| 2003/0063072 A1 | 4/2003 | Brandenberg et al. |
| 2003/0065805 A1 | 4/2003 | Barnes et al. |
| 2003/0108240 A1 | 6/2003 | Gutta et al. |
| 2003/0126250 A1 | 7/2003 | Jhanji |
| 2003/0135304 A1 | 7/2003 | Sroub et al. |
| 2003/0158655 A1 | 8/2003 | Obradovich et al. |
| 2003/0161499 A1 | 8/2003 | Svendsen et al. |
| 2003/0197626 A1 | 10/2003 | Endo et al. |
| 2003/0202018 A1 | 10/2003 | Kumagai |
| 2003/0225516 A1 | 12/2003 | DeKock et al. |
| 2003/0233278 A1 | 12/2003 | Marshall |
| 2004/0008225 A1* | 1/2004 | Campbell ............ G01C 21/367 715/764 |
| 2004/0024526 A1 | 2/2004 | Lokshin et al. |
| 2004/0030490 A1 | 2/2004 | Hegedus et al. |
| 2004/0036721 A1 | 2/2004 | Anderson et al. |

(56) References Cited

U.S. PATENT DOCUMENTS

| | | |
|---|---|---|
| 2004/0041805 A1 | 3/2004 | Hayano et al. |
| 2004/0064249 A1 | 4/2004 | Lacey et al. |
| 2004/0088412 A1 | 5/2004 | John et al. |
| 2004/0104842 A1 | 6/2004 | Drury et al. |
| 2004/0107042 A1 | 6/2004 | Seick |
| 2004/0111477 A1 | 6/2004 | Boss et al. |
| 2004/0128314 A1 | 7/2004 | Katibah et al. |
| 2004/0135885 A1 | 7/2004 | Hage |
| 2004/0162830 A1 | 8/2004 | Shirwadkar et al. |
| 2004/0167709 A1 | 8/2004 | Smitherman et al. |
| 2004/0172191 A1 | 9/2004 | Vitikainen et al. |
| 2004/0172460 A1 | 9/2004 | Marel et al. |
| 2004/0179512 A1 | 9/2004 | Leblanc et al. |
| 2004/0193368 A1 | 9/2004 | Sanqunetti |
| 2004/0193492 A1 | 9/2004 | Applebaum |
| 2004/0209601 A1 | 10/2004 | Obradovich et al. |
| 2004/0217980 A1 | 11/2004 | Radburn et al. |
| 2004/0225480 A1 | 11/2004 | Dunham |
| 2004/0249962 A1 | 12/2004 | Lecomte |
| 2004/0257276 A1 | 12/2004 | Huston et al. |
| 2005/0004749 A1 | 1/2005 | Park |
| 2005/0034074 A1 | 2/2005 | Munson et al. |
| 2005/0051623 A1* | 3/2005 | Okuda .................. G09B 29/106 235/384 |
| 2005/0071081 A1 | 3/2005 | Hirose et al. |
| 2005/0071119 A1 | 3/2005 | Obradovich et al. |
| 2005/0071328 A1 | 3/2005 | Lawrence |
| 2005/0073574 A1 | 4/2005 | Krisbergh et al. |
| 2005/0131631 A1 | 6/2005 | Nakano et al. |
| 2005/0184875 A1 | 8/2005 | Schmandt et al. |
| 2005/0216336 A1 | 9/2005 | Roberts et al. |
| 2005/0222989 A1 | 10/2005 | Haveliwala et al. |
| 2005/0251331 A1 | 11/2005 | Kreft |
| 2005/0256866 A1 | 11/2005 | Lu et al. |
| 2005/0268254 A1 | 12/2005 | Abramson et al. |
| 2005/0270311 A1 | 12/2005 | Rasmussen et al. |
| 2005/0273702 A1 | 12/2005 | Trabucco |
| 2005/0278371 A1 | 12/2005 | Funk et al. |
| 2005/0288958 A1 | 12/2005 | Eraker et al. |
| 2006/0002590 A1 | 1/2006 | Borak |
| 2006/0022978 A1 | 2/2006 | Hoff |
| 2006/0031764 A1 | 2/2006 | Keyser et al. |
| 2006/0041375 A1 | 2/2006 | Witmer et al. |
| 2006/0080178 A1 | 4/2006 | Lee |
| 2006/0088412 A1 | 4/2006 | Barton |
| 2006/0155597 A1 | 7/2006 | Gleason |
| 2006/0161348 A1 | 7/2006 | Cross et al. |
| 2006/0178932 A1 | 8/2006 | Lang |
| 2006/0200384 A1 | 9/2006 | Arutunian et al. |
| 2006/0204142 A1 | 9/2006 | West et al. |
| 2006/0230056 A1 | 10/2006 | Aaltonen |
| 2006/0230351 A1 | 10/2006 | Stehle et al. |
| 2006/0238379 A1 | 10/2006 | Kimchi et al. |
| 2006/0238380 A1 | 10/2006 | Kimchi et al. |
| 2006/0238381 A1 | 10/2006 | Kimchi et al. |
| 2006/0238382 A1 | 10/2006 | Kimchi et al. |
| 2006/0241859 A1 | 10/2006 | Kimchi et al. |
| 2006/0241860 A1 | 10/2006 | Kimchi et al. |
| 2006/0267966 A1 | 11/2006 | Grossman et al. |
| 2006/0287915 A1 | 12/2006 | Boulet et al. |
| 2007/0069923 A1 | 3/2007 | Mendelson |
| 2007/0171124 A1 | 7/2007 | Weill |
| 2007/0195373 A1 | 8/2007 | Singh |
| 2007/0210937 A1 | 9/2007 | Smith et al. |
| 2007/0273558 A1 | 11/2007 | Smith et al. |
| 2007/0296817 A1 | 12/2007 | Ebrahmi et al. |
| 2008/0055192 A1 | 3/2008 | Nagano et al. |
| 2008/0129839 A1 | 6/2008 | Asukai et al. |
| 2008/0136940 A1 | 6/2008 | Srikanth et al. |
| 2008/0180550 A1 | 7/2008 | Gulliksson |
| 2008/0215192 A1 | 9/2008 | Hardman et al. |
| 2009/0046093 A1 | 2/2009 | Kikuchi et al. |
| 2009/0073191 A1 | 3/2009 | Smith et al. |
| 2010/0118025 A1 | 5/2010 | Smith et al. |
| 2011/0131597 A1 | 6/2011 | Cera et al. |

FOREIGN PATENT DOCUMENTS

| | | |
|---|---|---|
| EP | 1 058 089 A2 | 12/2000 |
| EP | 1 426 910 | 6/2004 |
| EP | 1783510 | 5/2007 |
| GB | 2 387 244 | 10/2003 |
| JP | 08-138193 | 5/1996 |
| JP | H10-240124 A | 9/1998 |
| JP | 11-2541 | 6/1999 |
| JP | 2001-257972 | 9/2001 |
| JP | 2002-32282 | 1/2002 |
| JP | 2003-148975 | 5/2003 |
| JP | 2003-186389 | 7/2003 |
| JP | 2003-269969 | 9/2003 |
| JP | 2003-316808 A | 11/2003 |
| JP | 2004-021733 A | 1/2004 |
| JP | 2004-102631 A | 4/2004 |
| JP | 2006/074113 | 3/2006 |
| KR | 10-2005-0077643 | 8/2005 |
| KR | 10-2008-0026433 | 3/2008 |
| WO | WO 01/08053 | 2/2001 |
| WO | WO 02/13459 | 2/2002 |
| WO | WO 02/056210 | 7/2002 |
| WO | WO 03/013680 | 2/2003 |
| WO | WO 03/049035 | 6/2003 |
| WO | WO 2006/012120 | 2/2006 |
| WO | WO 2006/116240 | 11/2006 |
| WO | WO 2007/051953 | 5/2007 |

OTHER PUBLICATIONS

U.S. Appl. No. 11/246,435, filed Oct. 7, 2005 entitled "Virtual Earth Real-Time Advertising".

U.S. Appl. No. 11/246,436, filed Oct. 7, 2005 entitled "Virtual Earth Mapping".

U.S. Appl. No. 11/334,879, filed Jan. 19, 2006 entitled "Maintaining User Privacy in a Virtual Earth Environment".

U.S. Appl. No. 11/335,209, filed Jan. 19, 2006 entitled "Virtual Earth Community Based Recommendations".

U.S. Appl. No. 11/335,231, filed Jan. 19, 2006 entitled "Real-Time Virtual Earth Driving Information".

U.S. Appl. No. 11/354,790, filed Feb. 15, 2006 entitled "Virtual Earth Rooftop Overlay and Bounding".

U.S. Appl. No. 11/621,006, filed Jan. 8, 2007 entitled "Dynamic Map Rendering as a Function of a User Parameter".

U.S. Appl. No. 11/621,010, filed Jan. 8, 2007 entitled "Mode Information Displayed in a Mapping Application".

U.S. Appl. No. 11/621,011, filed Jan. 8, 2007 entitled "Dynamic Rendering of Map Information".

Audi Navigation Systems Plus Operating Instructions Manual, http://nav-plus.com/instructions/images/aduimanual.pdf. Appears to be an English version dated Aug. 1999, 7 pgs.

Browning et al., "A Maximium Entropy Approach to Collaborative Filtering", Journal of VLSI Signal Processing 37, pp. 199-209, 2004.

Faust, et al., "Real-Time Global Data Model for the Digital Earth," Proceedings of International Conference on Discrete Global Grids, M., 2000, 9 pgs.

Fukatsu et al., "Intuitive Control of Bird's Eye" Overview Images for Navigation in an Enormous Virtual Environment; Graduate School of Engineering; Osaka University; 1998, 10 pgs. (cited in EP OA Nov. 9, 2012).

Harrison et al., An Experimental Evaluation of Transparent Menu Usage, 1996, Toronto, Ontario, Canada, 14 pgs.

International Business Machines Corporation; Efficient 3D Method for Displaying Browser Uniform Resource Locator Bookmarks; Jan. 1998; Technical Disclosure Bulletin; 3 pgs.

Laffey et al., "Intellgent Real-Time Monitoring", ESD/SMI Expert Systems Proceedings, pp. 365-375, Apr. 1988.

Leclerc, et al., "Digital Earth: Building the New World," In proceedings of the 5th International Conference on Virtual Systems and Multimedia, Sep. 1-3, 1999, 45 pgs., Dundee, Scotland.

Leclerc, et al., "Digital Earth: Building the New World", In proceedings of the 5th International Conference on Virtual Systems and Multimedia, Sep. 1-3, 1999, 11 pgs., Dundee, Scotland.

(56) References Cited

OTHER PUBLICATIONS

Luo et al., "On the Application of Bayes Networks to Semantic Understanding of Consumer Photographs", Proceedings of the 2000 International Conference on Image Processing, vol. 3. The Institute of Electrical and Electronics Engineers. Sep. 10-13, 2000.
Magellan RoadMate 500/700 copyright dated 2003, from http://www.magellangps.com/ assets/manuals/newprod/manual.sub.-Magellan Road-Mate Series. pdf on Sep. 17, 2004, 27 pgs. (cited in Dec. 24, 2009 OA).
Magellan RoadMate 700 (North America) copyright dated 2004. Document retrieved from http://www.magellangps. com/en/products/producl.asp?PRODID=995 on Sep. 17, 2004, 2 pgs. (cited in Dec. 24, 2009 OA).
Magellan GPS-Support, http://mageliangps.com/en/products/producl.asp?PRODID=950, MapSend DirectRoute, Magellan Products, downloaded Aug. 27, 2004, 1 pg.
Roofshout; http://www.roofshout.com; 2 pages; last viewed 4112/2006.
Sepe, R. B. Jr., "Web-enabled vehicle data acquisition with remote real-time access", Sensors—USA, Mar. 2004, vol. 21, No. 3, p. 22-7.
Timeline found at website http://www.google.com/about/corporate/company/ history.html ; Document downloaded on Jun. 28, 2011; see p. 12 of 39 for information related to Jun. 2005.
Ueda et al., "A System for Retrieval and Digest Creation of Video Data Based on Geographic Location", 13th Unternational Conference on Database and Expert Systems Application, pp. 768-778, 2002.
xSP; Advertising on Google Earth; http://www.internetnews.com/xsP/article.php/3594841; 4 pages; last viewed Apr. 12, 2006.
Yates, J.D., et al., "Searching the Web Using a Map," Department of Computer Science and Electrical Engineering, the University of Queensland, Brisbane, Australia, 2000, 8 pgs. (cited in EP Search Report, Sep. 27, 2010).
International Search Report dated Oct. 4, 2007 for PCT Application Serial No. PCT/US2006/15349.
International Search Report dated Apr. 2, 2008 for PCT Application Serial No. PCT/US2008/050441.
International Search Report dated May 20, 2008 for PCT Application Serial No. PCT/US2008/050412.
International Search Report dated Jun. 9, 2008 for PCT Application Serial No. PCT/US2008/050373.
Supplemental EP Search Report, dated Sep. 27, 2010 cited in Appln No. PCT/US2006/015349.
Chinese Office Action dated Oct. 13, 2010 cited in Appln No. 200680013358.1.
Chinese Office Action dated Mar. 17, 2011 cited in Appln No. 200880001806.5.
Chinese Office Action dated Aug. 1, 2011 cited in Appln No. 200880001794.6.
Chinese Office Action dated Aug. 15, 2011 cited in Appln No. 200880001754.1.
Chinese Office Action dated Sep. 7, 2011 cited in Appln No. 201110038908.8.
International Search Report dated Dec. 14, 2011 for PCT Application Serial No. PCT/US2008/050441.
Korean Notice of Preliminary Rejection dated Jun. 7, 2012 cited in Appln No. 10-2007-7023624.
Chinese Second Office Action dated Jun. 5, 2012 cited in Appln No. 200880001754.1.
Chinese Second Office Action dated Jun. 13, 2012 cited in Appln No. 201110038908.8.
Chinese Second Office Action dated Apr. 28, 2012 cited in Appln No. 200880001794.6.
EP Communication dated Nov. 9, 2012 cited in Appln No. 06 751 153.5.
Chinese Third Office Action dated Nov. 27, 2012 cited in Appln No. 201110038908.8.
Chinese Fourth Office Action dated Feb. 5, 2013 cited in Appl No. 20088001754.1.
Chinese Fourth Office Action dated Aug. 5, 2013 cited in Appln No. 20088001754.1.
European Search Report dated Oct. 16, 2013 cited in Appln No. 08 71 3602.4 3 pages.
Japanese Notice of Rejection dated Nov. 18, 2013 cited in Appln No. 2012-102025.
U.S. Official Action dated Apr. 11, 2008 cited in U.S. Appl. No. 11/335,231, 17 pgs.
U.S. Official Action dated Apr. 16, 2008 cited in U.S. Appl. No. 11/354,790, 14 pgs.
Response dated Jul. 11, 2008 cited in U.S. Appl. No. 11/335,231, 14 pgs.
Response dated Jul. 16, 2008 cited in U.S. Appl. No. 11/354,790, 16 pgs.
Notice of Allowance dated Aug. 18, 2008 cited in U.S. Appl. No. 11/354,790, 11 pgs.
U.S. Official Action dated Oct. 9, 2008 cited in U.S. Appl. No. 11/335,231, 13 pgs.
U.S. Official Action dated Nov. 12, 2008 cited in U.S. Appl. No. 11/335,209, 18 pgs.
U.S. Official Action dated Dec. 8, 2008 cited in U.S. Appl. No. 11/334,879, 23 pgs.
Response dated Dec. 9, 2008 cited in U.S. Appl. No. 11/335,231, 8 pgs.
U.S. Official Action dated Feb. 6, 2009 cited in U.S. Appl. No. 11/246,774, 35 pgs.
Response dated Feb. 12, 2009 cited in U.S. Appl. No. 11/335,209, 12 pgs.
Response dated Mar. 6, 2009 cited in U.S. Appl. No. 11/334,879, 103 pgs.
Response dated Apr. 9, 2009 cited in U.S. Appl. No. 11/335,231, 7 pgs.
Notice of Allowance dated Apr. 22, 2009 cited in U.S. Appl. No. 11/335,231, 6 pgs.
U.S. Official Action dated May 29, 2009 cited in U.S. Appl. No. 11/335,209, 39 pgs.
U.S. Official Action dated Jun. 1, 2009 cited in U.S. Appl. No. 11/246,436, 9 pgs.
Response dated Jun. 8, 2009 cited in U.S. Appl. No. 11/246,774, 13 pgs.
U.S. Official Action dated Jun. 19, 2009 cited in U.S. Appl. No. 11/334,879, 19 pgs.
Response dated Aug. 27, 2009 cited in U.S. Appl. No. 11/335,209, 11 pgs.
Response dated Aug. 28, 2009 cited in U.S. Appl. No. 11/246,436, 9 pgs.
U.S. Official Action dated Sep. 1, 2009 cited in U.S. Appl. No. 11/246,774, 31 pgs.
Response dated Sep. 14, 2009 cited in U.S. Appl. No. 11/621,006, 6 pgs.
Response dated Sep. 21, 2009 cited in U.S. Appl. No. 11/334,879, 12 pgs.
U.S. Official Action dated Sep. 24, 2009 cited in U.S. Appl. No. 12/275,970, 16 pgs.
U.S. Official Action dated Oct. 1, 2009 cited in U.S. Appl. No. 11/621,010, 24 pgs.
U.S. Official Action dated Oct. 28, 2009 cited in U.S. Appl. No. 11/246,435, 32 pgs.
U.S. Official Action dated Oct. 29, 2009 cited in U.S. Appl. No. 11/335,209, 39 pgs.
Response dated Nov. 23, 2009 cited in U.S. Appl. No. 11/246,774, 14 pgs.
U.S. Official Action dated Dec. 3, 2009 cited in U.S. Appl. No. 11/334,879, 24 pgs.
Response dated Dec. 21, 2009 cited in U.S. Appl. No. 12/275,970, 10 pgs.
U.S. Official Action dated Dec. 24, 2009 cited in U.S. Appl. No. 11/246,436, 15 pgs.
Response dated Jan. 4, 2010 cited in U.S. Appl. No. 11/621,010, 7 pgs.
Response dated Jan. 14, 2010 cited in U.S. Appl. No. 11/335,209, 11 pgs.

(56) References Cited

OTHER PUBLICATIONS

U.S. Official Action dated Jan. 26, 2010 cited in U.S. Appl. No. 11/621,006, 22 pgs.
Response dated Jan. 28, 2010 cited in U.S. Appl. No. 11/246,435, 12 pgs.
Response dated Mar. 3, 2010 cited in U.S. Appl. No. 11/334,879, 10 pgs.
U.S. Official Action dated Mar. 8, 2010 cited in U.S. Appl. No. 11/621,011, 26 pgs.
U.S. Official Action dated Mar. 10, 2010 cited in U.S. Appl. No. 12/275,970, 13 pgs.
Notice of Allowance dated Mar. 19, 2010 cited in U.S. Appl. No. 11/621,010, 13 pgs.
Response dated Mar. 24, 2010 cited in U.S. Appl. No. 11/246,436, 11 pgs.
Response dated Apr. 26, 2010 cited in U.S. Appl. No. 11/621,006, 8 pgs.
U.S. Official Action dated Apr. 27, 2010 cited in U.S. Appl. No. 11/335,209, 39 pgs.
U.S. Official Action dated May 11, 2010 cited in U.S. Appl. No. 11/246,435, 22 pgs.
Response dated Jun. 8, 2010 cited in U.S. Appl. No. 12/275,970, 11 pgs.
U.S. Official Action dated Jun. 9, 2010 cited in U.S. Appl. No. 11/334,879, 29 pgs.
U.S. Official Action dated Jul. 19, 2010 cited in U.S. Appl. No. 11/246,436, 17 pgs.
U.S. Official Action dated Jul. 19, 2010 cited in U.S. Appl. No. 11/621,006, 22 pgs.
U.S. Official Action dated Jul. 22, 2010 cited in U.S. Appl. No. 12/275,970, 8 pgs.
Response dated Jul. 27, 2010 cited in U.S. Appl. No. 11/335,209, 12 pgs.
U.S. Official Action dated Aug. 3, 2010 cited in U.S. Appl. No. 11/246,774, 31 pgs.
Response dated Aug. 11, 2010 cited in U.S. Appl. No. 11/246,435, 12 pgs.
Response dated Sep. 8, 2010 cited in U.S. Appl. No. 11/621,011, 10 pgs.
Response dated Sep. 9, 2010 cited in U.S. Appl. No. 11/334,879, 13 pgs.
U.S. Official Action dated Sep. 15, 2010 cited in U.S. Appl. No. 11/246,435, 22 pgs.
U.S. Official Action dated Oct. 13, 2010 cited in U.S. Appl. No. 11/335,209, 35 pgs.
U.S. Official Action dated Oct. 15, 2010 cited in U.S. Appl. No. 11/334,879, 23 pgs.
Response dated Oct. 19, 2010 cited in U.S. Appl. No. 11/246,436, 12 pgs.
Response dated Oct. 19, 2010 cited in U.S. Appl. No. 11/621,006, 9 pgs.
Response dated Nov. 2, 2010 cited in U.S. Appl. No. 11/246,774, 14 pgs.
Notice of Allowance dated Dec. 10, 2010 cited in U.S. Appl. No. 12/275,970, 10 pgs.
Response dated Dec. 15, 2010 cited in U.S. Appl. No. 11/246,435, 12 pgs.
U.S. Official Action dated Dec. 23, 2010 cited in U.S. Appl. No. 11/621,006, 27 pgs.
U.S. Official Action dated Dec. 23, 2010 cited in U.S. Appl. No. 11/621,011, 15 pgs.
Response dated Jan. 11, 2011 cited in U.S. Appl. No. 11/335,209, 11 pgs.
Response dated Jan. 18, 2011 cited in U.S. Appl. No. 11/334,879, 9 pgs.
U.S. Official Action dated Jan. 19, 2011 cited in U.S. Appl. No. 11/246,774, 28 pgs.
Response dated Mar. 23, 2011 cited in U.S. Appl. No. 11/621,006, 9 pgs.
Response dated Mar. 23, 2011 cited in U.S. Appl. No. 11/621,011, 12 pgs.
U.S. Official Action dated Mar. 30, 2011 cited in U.S. Appl. No. 11/334,879, 18 pgs.
U.S. Official Action dated Apr. 28, 2011 cited in U.S. Appl. No. 11/246,436, 13 pgs.
U.S. Official Action dated Jun. 3, 2011 cited in U.S. Appl. No. 11/621,006, 31 pgs.
Response dated Jun. 28, 2011 cited in U.S. Appl. No. 11/335,209, 10 pgs.
Response dated Jun. 30, 2011 cited in U.S. Appl. No. 11/334,879, 13 pgs.
Response dated Jul. 26, 2011 cited in U.S. Appl. No. 11/246,436, 11 pgs.
U.S. Official Action dated Sep. 1, 2011 cited in U.S. Appl. No. 11/335,209, 21 pgs.
Response dated Sep. 6, 2011 cited in U.S. Appl. No. 11/621,006, 8 pgs.
U.S. Official Action dated Sep. 8, 2011 cited in U.S. Appl. No. 11/334,879, 20 pgs.
U.S. Official Action dated Oct. 21, 2011 cited in U.S. Appl. No. 11/246,436, 22 pgs.
Notice of Allowance dated Oct. 26, 2011 cited in U.S. Appl. No. 11/621,006, 9 pgs.
Response dated Nov. 1, 2011 cited in U.S. Appl. No. 11/335,209, 8 pgs.
Response dated Jan. 18, 2012 cited in U.S. Appl. No. 11/246,436, 11 pgs.
U.S. Official Action dated Apr. 3, 2012 cited in U.S. Appl. No. 11/246,436, 25 pgs.
Response dated Jul. 11, 2012 cited in U.S. Appl. No. 11/246,436, 5 pgs.
U.S. Official Action dated Sep. 4, 2012 cited in U.S. Appl. No. 11/246,774, 13 pgs.
U.S. Official Action dated Oct. 9, 2012 cited in U.S. Appl. No. 11/246,436, 16 pgs.
U.S. Official Action dated Oct. 11, 2012 cited in U.S. Appl. No. 11/621,011, 23 pgs.
Response dated Dec. 4, 2012 cited in U.S. Appl. No. 11/246,774, 12 pgs.
U.S. Official Action dated Dec. 26, 2012 cited in U.S. Appl. No. 11/246,774, 16 pgs.
Response dated Feb. 11, 2013 cited in U.S. Appl. No. 11/621,011, 12 pgs.
Response dated Apr. 3, 2013 cited in U.S. Appl. No. 11/246,436, 10 pgs.
U.S. Official Action dated Jun. 10, 2013 cited in U.S. Appl. No. 11/621,011, 19 pgs.
U.S. Official Action dated Jun. 19, 2013 cited in U.S. Appl. No. 11/246,436, 6 pgs.
U.S. Official Action dated Jul. 29, 2013 cited in U.S. Appl. No. 11/246,435, 28 pgs.
Notice of Allowance dated Aug. 1, 2013 cited in U.S. Appl. No. 11/246,774, 16 pgs.
U.S. Official Action dated Sep. 25, 2013 cited in U.S. Appl. No. 11/246,436, 8 pgs.
Response dated Oct. 29, 2013 cited in U.S. Appl. No. 11/246,435, 16 pgs.
U.S. Official Action dated Nov. 26, 2013 cited in U.S. Appl. No. 11/246,435, 13 pgs.
Almer et al., "Multimedia Visualisation of Geoinformation for Tourism Regions Based on Remote Sensing Data", 2002, 6 pgs.
Chew, et al., Panorama stitching using overlap area weighted image plane projection and dynamic programming for visual localization; Advanced Intelligent Mechatronics (AIM), 2012 IEEE/ASME International Conference on Digital Object Identifier: 10.11 09/AIM. 2012.6265995; Publication Year: 2012, pp. 250-255.

(56) References Cited

OTHER PUBLICATIONS

Condit, "Dynamic Digital Maps: A Means to Distribute Maps and Associated Media via Web and CD", 2005, http://ddm.geo.umass.edu/05Condit.pdf, 16 pgs.

Grzeszczuk, et al., Creating Compact Architectural Models by Geo-Registering Image Collections; Computer Vision Workshops (ICCV Workshops), 2009 IEEE 12th International Conference on; Digital Object Identifier: 10.1109/ICCVW.2009.5457490; Publication Year: 2009, pp. 1718-1725.

Kwon, et al., A New Map Stitching Method for Anchor-free Localization in Wireless Sensor Networks; Computer and Information Technology, 2006. CIT '06. The Sixth IEEE International Conference on; Digital Object Identifier: 10.1109/CIT.2006.17; Publication Year: 2006, pp. 236.

Kwon et al.; Localization through Map Stitching in Wireless Sensor Networks; Parallel and Distributed Systems, IEEE Transactions on; vol. 19, Issue: 1; Digital Object Identifier: 10.1109/TPDS.2007.70706 Publication Year: 2008, pp. 93-105.

Paletta et al., "Visual object recognition for mobile tourist information systems", 2005, 3 pgs.

Chinese Office Action dated May 16, 2014 cited in Appln No. 201210110939.4, 16 pgs.

Response dated Jan. 22, 2014 cited in U.S. Appl. No. 11/246,436, 9 pgs.

Notice of Allowance dated May 21, 2014 cited in U.S. Appl. No. 11/246,436, 13 pgs.

Notice of Allowance dated May 21, 2014 cited in U.S. Appl. No. 11/246,774, 9 pgs.

Japanese Notice of Allowance Issued for Patent Application No. 2012-102025, Mailed Date: Jul. 16, 2014, Filed Date: Apr. 21, 2006, 4 Pages.

\* cited by examiner

OBTAINING AND DISPLAYING VIRTUAL EARTH IMAGES

CROSS-REFERENCE TO RELATED APPLICATIONS

This is an a continuation application of U.S. Non-Provisional application Ser. No. 11/246,774, now U.S. Pat. No. 8,850,011, filed Oct. 7, 2005, which claims the benefit under 35 U.S.C. §119(e) of U.S. Provisional Application Ser. No. 60/673,442, now expired, filed Apr. 21, 2005, and entitled "VIRTUAL EARTH", the entirety of which is incorporated herein by reference. This application is also related to co-pending U.S. patent application Ser. No. 11/246,436, now U.S. Pat. No. 8,843,309, filed Oct. 7, 2005, entitled, "VIRTUAL EARTH MAPPING" and co-pending U.S. patent application Ser. No. 11/246,435, now abandoned, filed Oct. 7, 2005, and entitled, "VIRTUAL EARTH REAL-TIME ADVERTISING".

BACKGROUND

Mapping systems that provide users direction information and location of various registered locales are commonly utilized. Map making has largely been carried out by visitors to a particular place. The knowledge of places acquired by these visitors was then aggregated and assimilated into useful models that answered the question 'what's it like there?' In the Age of Discovery, the cartographic knowledge gained was often not shared. In this closed system, maps were viewed as a competitive advantage over other nation states.

The person with the best available knowledge of a particular area was in a superior position when it came to conquest, settlement, or trade. As the world was discovered, knowledge of its geography gradually spread to more and more people and maps improved. As technology advanced, so did the accuracy of mapmaking until arriving at what today is generally agreed upon as maps of the world.

As incredibly detailed and broadly available as they have become, the creation of maps remains an inherently closed system. Third party cartographers face the insurmountable challenge of keeping their maps accurate and up to date since the world is ever changing and no sooner is a map published than it is obsolete. Suburban map makers especially can never hope to visit a place often enough to keep things up to date let alone increase the resolution of today's maps. Local knowledge of a place is always better than what a visitor can hope to capture.

Today sources of information are isolated and a user, desiring a diverse amount of information generally has to access each isolated pocket of information. For example, to view weather data a user might access weather.com. Other examples of such pockets of information include real estate listings found on redfin.com, traffic on wa.gov, and personal photographs on ofoto.com. However, if a user interested in purchasing a house is concerned about the traffic and weather patterns in the area, the user has to access each isolated repository of information separately. This is not only time-consuming but can be frustrating especially if a user is not familiar with the wealth of information available and/or how to access such information.

Another development related to the wealth of information available is Internet advertising or "E-commerce." E-commerce is a way of carrying out business transactions over the Internet and is commonly used by consumers for ease of ordering. Common forms of Internet advertising are banner ads and pop-up ads. Banner ads are advertisements placed on a web page by a third party, who can provide free services or payment in return for the ability to place the ads on the web page. Some web pages are supported by banner ads. A pop-up ad is an advertisement that appears automatically in a separate window when a particular web page is viewed. However, banner ads and pop-up ads offer no effective means for an advertiser to tailor advertisements based on a user location and/or a user preference.

To overcome the aforementioned deficiencies, provided are embodiments that provide a user a common repository of information ranging from weather to traffic patterns to real-time events. The disparate sources of information are brought together in a single logical framework. Also provided is a means for a user location to be determined and communicated to enable advertisers to provide advertisements tailored to a specific user.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

Embodiments describe a method and/or system for providing a common repository for information about the "real" world. This can include detailed three-dimensional models of locations on planet Earth, satellite photographs, real-time web cams, user annotations, maps, points of interest, geological information, real-time traffic, real estate sales, driving directions, interior places, etc. In accordance with the features presented herein, is a platform, a set of experiences, and, continuous capturing of data and images (e.g., live video, continuous motion), that includes any and all information about the physical world, and allows such information to be accessible to a user "on demand." This information can further be updated over time, allowing for current viewing, historical viewing, and/or projections as to how the area will be viewed in the future. The features presented herein are not limited to the earth and can encompass objects in outer space, as well as, imaginary world(s) as provided by users. Also provided is an active community for capturing, connecting, sharing, and visualizing information based on location. Embodiments provide the schema, repository, index, and Application Program Interfaces (API) for any information, place, entity, attribute, service, or person that can be referenced geographically.

The disclosed embodiments are built on core premises: location relates otherwise disparate information sources, there is value in "tail" information sources, and tail information is (in many cases) intrinsically local. These concepts together enable a self-sustaining ecosystem that is rich in relevant information. The data model is able to encode anything in the real word and is a collection of layers attributed in many ways, based on a common core schema. Virtual Earth is assembled from an earth model (a sphere), multiple topography attitude maps, multiple overhead and non-overhead raster images, vector objects (roads), cultural objects (buildings), dynamic objects (cars), time information (including transient objects (events)), and interactive objects (people).

According to an aspect, a map is provided that is the centerpiece of a page or screen and can cover the entire screen or viewing area. A plurality of controls, such as "zoom in" or "zoom out," for example, are placed on top of or overlaying the map, rather than being placed around the perimeter of the map, which tends to reduce the viewing area of the map. When a user moves a cursor around the screen, the map and everything associated with the map, including the controls, are dynamically and automatically updated with that movement. As the cursor is moved, the map is continuously refreshed in an "auto refresh" process without requiring the user to manually refresh the screen.

According to an embodiment is a rich application that allows users to immerse in a virtualized earth, e.g., to intimately know "what it is like there." Provided is a set of augmentation technologies, clients, applications and services that enable applications to overlay location-related data "on top of the real world," spanning mobile devices to automotive solutions to wearable computers. Disclosed is a spatial database with a powerful spatial search and filtering engine. According to another embodiment is a set of APIs, protocols, schemas, services, servers and clients that allow data-owners to manage, publish, selectively-share and monetize location-related content and location-aware application. Also provided is an ecosystem that allows publishers (both commercial and individual) to be compensated for sharing location-related data.

According to an embodiment is a 3D navigation of the earth at a high resolution, which allows integration with 3D video and 3D models that are geo-referenced to allow a seamless experience from space down to street-level and even within interior spaces. The user can get an understanding of what a remote location is like, or obtain views on a known location that are only possible through overlaying visualizations of ancillary data (e.g., weather, traffic, real-estate information, pollution plumes, sales by territory, demographic stations and projections or simulation model results.) In another embodiment, this information can be produced for mobile devices, thin clients, or non-visual representations (e.g., text, voice).

According to a further embodiment, community based content and location information provided by sources combined with features such as real-time social networking are joined to provide one-stop answers about what is going on at a particular place. Combining location, history, time, and community information facilitates an automated selected of local events, restaurants, places and more based on a user's (and people like the user) historical set of decisions. According to another embodiment, temporal attribution allows users to get information on past, current, or future (forecast) data. Discrete time-based information is supported, such as event as well as real-time or near real-time data (e.g., traffic, weather, river, or tide levels, vote tallies, observe sun/moon/stars, seasons, and other temporally tagged information that can be modeled, archived, or forecast). Also supported is historical data to allow applications to perform time filters of projections, such as historical and predictive traffic data.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents. Other advantages and novel features will become apparent from the following detailed description when considered in conjunction with the drawings.

DETAILED DESCRIPTION

Figure 1:
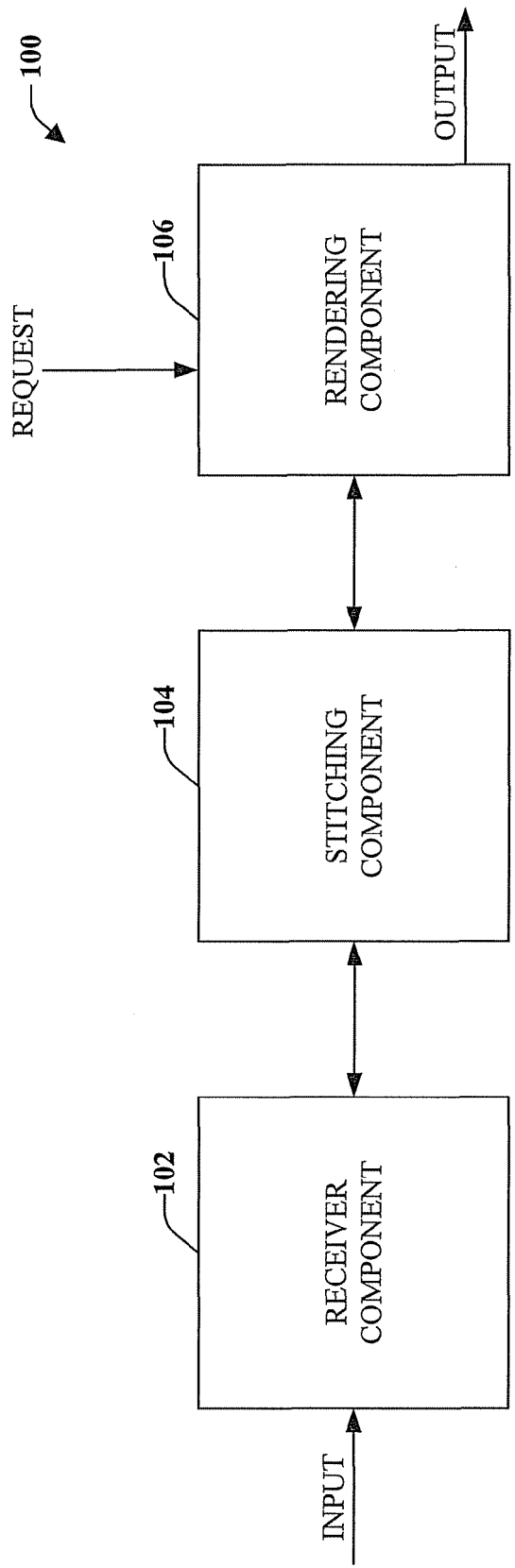
FIG. 1 illustrates a system for obtaining and displaying map information and associated data.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

With respect to taking automatic action, machine-learning techniques can be implemented to facilitate performing automatic action. Moreover, utility based analyses (e.g., factoring benefit of taking correct automatic action versus costs of taking incorrect action) can be incorporated into performing the automatic action. More particularly, these artificial intelligence (AI) based aspects can be implemented by any suitable machine-learning based technique and/or statistical-based techniques and/or probabilistic-based techniques. For example, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, . . . are contemplated and are intended to fall within the scope of the hereto appended claims Referring initially to FIG. 1, illustrated is a system 100 for obtaining and displaying map information and associated data. The system 100 facilitates receiving from a plurality of users and/or entities (e.g., the Internet, another system, a computer, . . . ), hereinafter referred to as users, a vast amount of information to populate one or more databases or repositories. The system 100 further facilitates providing to a plurality of users map information including information about the world as it is at the time the user is viewing the map ("right now"). The map information can include real traffic, a skyscraper under construction, interior spaces, or anything else that can be perceived and for which a user desires information. The map information can include personalized location-based (distance, relevance, etc.) results, including directions and navigations results. By way of example and not limitation the map information can include restaurants in a neighborhood, results for restaurants the user has visited recently, each displayed restaurant's specials for the night, how others (e.g., friends, family, contacts, neighbors, . . . ) have rated each restaurant, etc.

System 100 includes a receiver component 102 that interfaces with a data collection or stitching component 104 and a rendering component 106. The receiver component 102 is configured to obtain, receive, request, etc. input from a plurality of users. The input can be a plurality of information in various forms including written data, voice communication, one-dimensional (1D), two-dimensional (2D), two and a half-dimensional (2.5D), three-dimensional (3D), etc. imagery that relates to a plurality of geographic locations, and other data that can be transmitted through wired and/or wireless communication. Information can be provided to the receiver component 102 through users (e.g., database, computer system, . . . ) that contain isolated data. The receiver component 102 is configured to access the isolated data and bring all these disparate sources of information together into a single logical framework.

At a substantially similar time as information is available at the receiver component 102 it is transmitted to a stitching component 104 that stores the data in a format that is readily retrievable. In another embodiment, the input data from the receiver component 102 might be delayed before transmission to the stitching component 104. In a further embodiment, the information can be sent to the stitching component 104 at substantially the same time as received at the receiver component 102 and retained in the stitching component 104 for a predetermined time before the data is available at the rendering component 106. The delay in transit time of the information between the receiver component 102, stitching component 104, and/or rendering component 106 takes into account various factors including privacy issues. For example, a user that provides three-dimensional or other data concerning such user's current location might not want others to know the exact location of such user (e.g., real-time tracking). Thus, there can be a delay function associated with system 100. The delay can be measured in time (e.g., hours, days, weeks), during certain time frames (e.g., from 8 a.m. to 5 p.m. provide my exact location to everyone, from 5 p.m. to 8 a.m. only allow my spouse to see my exact location), or other means of tracking an interval or period. An optional opt-in (or opt-out) procedure can be utilized whereby a user decides whether to allow the system 100 to provide others real-time data about the user. The user can set-up and control privacy parameters regarding when to display real-time data, the precision of such data, the persons who can access the data. The system can provide for encryption of data rendering it only recoverable on the user's machine. The user can select an option to make trails local-only with no publication to the service, as well as other parameters that take into account privacy and safety concerns.

The user can also supply annotated information about a particular location. For example, for a zoo, a user can input a picture of a particular animal that such user wants others to see, or the user can input a text or voice message, such as "check out the new monkey display!". This information can be available when another user conducts a search and the zoo or surrounding area is displayed on the map. In addition, information provided from the particular source (e.g., zoo) can be provided for the user to select. Such information can include particular data about the entity, such as exhibits, hours of operation, internal map of the zoo showing paths, etc. Other data that can be displayed can be a task list or other user-defined information that the user would like to view that is personal to the user.

Data communicated to the receiver component 102 from a user generally is associated with a particular entity or object (e.g., building, landscape, house, street corner, landmark, . . . ) or a specific geographic location (address, geographic coordinates). The stitching component 104 is configured to associate each piece of data with a geographic location, such as through geographic coordinates, for example. The stitching component 104 is configured to bind the data, including a three-dimensional image together using the discrete data and/or data images received. The stitching component 104 communicates the information to the rendering component 106 when a user request is received by system 100.

The rendering component 106 is configured to provide (output data to) a user the ability to retrieve requested information and navigate the stitched image data in a seamless three-dimensional manner. The three-dimensional rendering can be a plurality of navigation angles (e.g., oblique-view, bird's eye angle, perspective angle, top viewing angle, front viewing angle, downward trajectory, upward trajectory, . . . ). The user can receive the information based on a user inquiry that can include a specific location and/or a range (e.g., 10 miles, 25 miles) surrounding a location. The location can be based on geographic coordinates, street name, street address, city, street, or other means of identifying a place, person, and/or thing to be viewed.

The rendering component 106 is configured to enable a plurality of users to view similar geographic images and associated data at a substantially similar time. For example, a certain geographic area may be or may become a "hot spot" due to a foreseen event (e.g., sporting event, music concert, political event, . . . ) or an unforeseen event (e.g., environmental conditions, terrorist attacks, . . . ), wherein a plurality of users desire to view the event or place at substantially the same time. The rendering component 106 is configured to provide each user with the requested geographic area while allowing each user the ability to manipulate the viewed image and associated data (e.g., zoom, move the image around on the display surface, . . . ) independently from the viewing performed by the other plurality of users.

In another embodiment, information regarding a user's contacts (e.g., family, friends, co-workers, co-students, . . . ) can be provided to a user in response to a prompt or request for information regarding places that might be of interest (e.g., restaurants, sporting events, stores, . . . ). For example, a user could be visiting a location for business or another purpose and desire information about what to do while visiting that place. The user can request such information, while at the actual location or remotely from another place which could be anywhere, provided there is a means for system 100 to obtain and communicate the information to user.

According to another embodiment, system 100 can facilitate providing directions or navigational information to one or more locations. The quickest or best route can be determined by system 100 based on information recently received from one or more users in the area. The route can be highlighted or marked in a different color. In a further embodiment, system 100 can facilitate real-time advertising and/or on-line advertising to one or more users based on various criteria including a user location, user preference, user request, advertiser location, advertiser rank, advertiser rating, etc.

Figure 2:
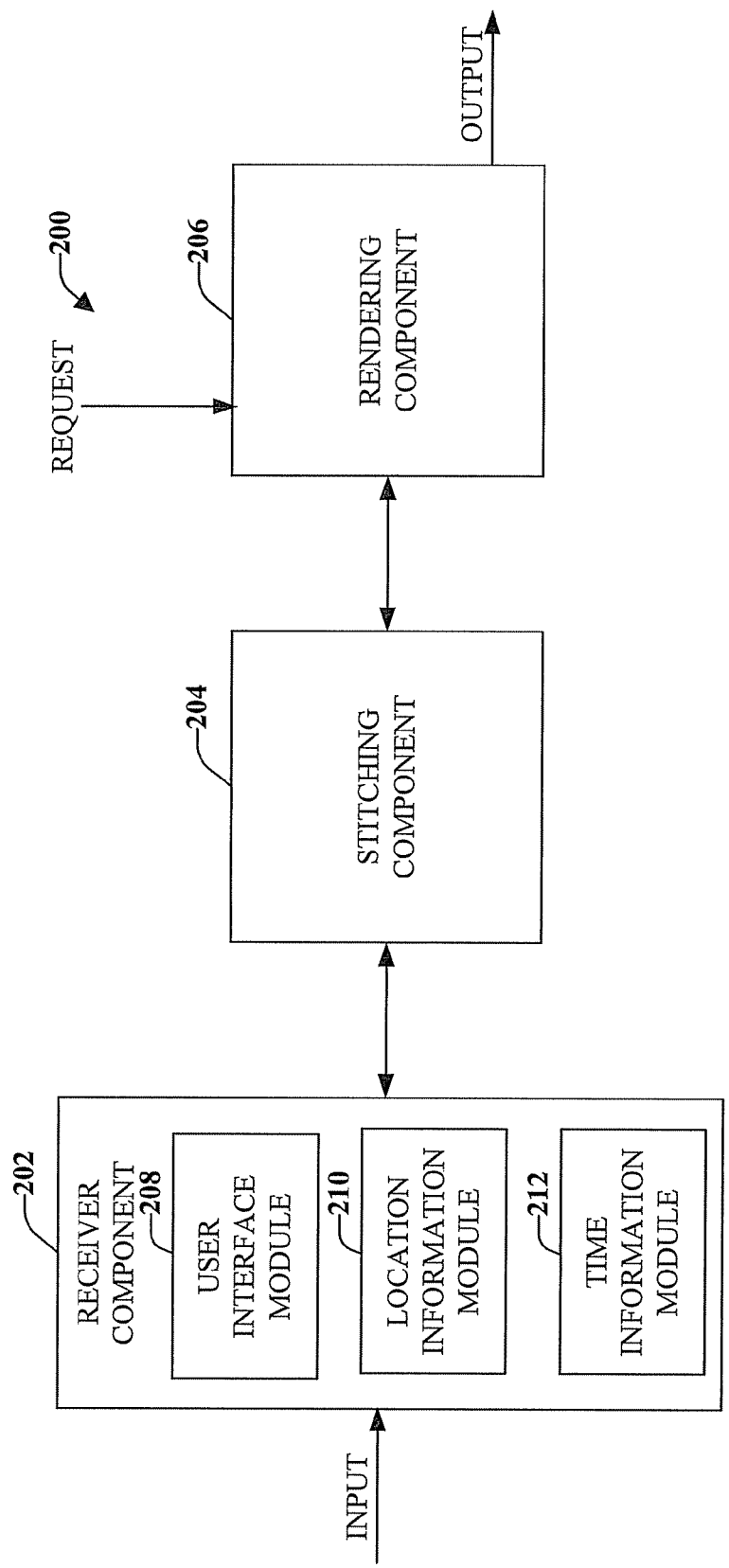
FIG. 2 illustrates a system for facilitating user input for data compilation.

FIG. 2 illustrates a system 200 for facilitating user input for data compilation. System 200 includes a receiver component 202 that accepts information from a plurality of users. The information is communicated to a stitching component 204 configured to organize the data and transmit the information into a usable format. A rendering component 206 provides a plurality of users with the information in an "as needed" or "on demand" basis. The rendering component 206 outputs the requested data to the user(s).

The receiver component 202 is configured to receive, request, query, accept, etc. data from a plurality of users. The data can be received from a plurality of devices, including mobile phones, regular and panoramic cameras, and other devices that can communicate information. To facilitate such data acceptance, the receiver component 202 can include various modules including a user interface module 208, a location information module 210, and/or a time information module 212. It should be understood that there might be more or less modules than those illustrated and described. Although the modules 208, 210, and 212 are shown and described with reference to a receiver component 202, they can be located as individual modules or they can be associated with other system 200 components.

The user interface module 208 is configured to enable a user to interact with system 200 and provide image data or other information. The user interface module 208 can provide a graphical user interface (GUI), a command line interface, and the like. For example, a GUI can be rendered that provides a user with a region or means to load, import, read, etc.

the various forms of data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with the user interface module 208 by entering the information into an edit control.

The user can also interact with the regions to select and provide information through various devices such as a mouse, a roller ball, a keypad, a keyboard, a pen, a digital camera, and/or voice activation, for example. Typically, a mechanism such as a push button or the enter key on the keyboard can be employed subsequent entering the information in order to initiate information conveyance. However, it is to be appreciated that the embodiments described herein are not so limited. For example, merely highlighting a check box can initiate information conveyance. In another example, a command line interface can be employed. For example, the command line interface can prompt (e.g., through a text message on a display, an audio tone, . . . ) the user for information by providing a text message. The user can than provide suitable information, such as digital image data, alpha-numeric input corresponding to an option provided in the interface prompt, an answer to a question posed in the prompt, or other input data. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The user interface module 208 can also receive data from user-entities (e.g., the Internet, another system, a computer, . . . ). For example, owners of data can interact with system 200 to publish data "by reference" and the system 200 will either redirect queries to the actual data (link model) or proxy the data though the system 200 (syndication model, which can include aggregate-type processing). The system 200 can be pre-populated (head data) and/or continuously updated (tail data) with a database of readily available commercial and public information.

Interaction with the receiver component 202 allows the community of individual users to build on, expand, and update the database with input data, thus continuously increasing the quantity, improving the quality, and updating the accuracy of the data. The information provided by individual users might be considered untrustworthy and can be distinguished from trustworthy data until its level of trustworthiness rises to an appropriate level. The system 200 can further gather and display data images and other information relating to interior spaces (e.g., homes, buildings, stores, restaurants, factories, . . . ), aerial images, and underwater locations. Information that can be added by individual users includes roads, best fishing or bird watching spots, annotations that show construction information, etc. Other information can be provided from commercial organizations, such as shopping malls that upload mall layout information and individual stores that provide information about sales or other relevant data. It should be noted that this information can be collected worldwide and the data associated with the disclosed embodiments is not limited to one area or country.

Users can also input or provide to the receiver component 202 rating and reviews for every entity (e.g., businesses and services, events, venues) and can rate each other's reviews to reduce potential spam. Ratings can be on different dimensions, for example, "the location is fantastic, great sunsets, but the picture you have here is terrible." The ratings can be input into a Recommendation Engine associated with the receiver component 202, for example, that utilizes the ratings to create cross recommendations between highly rated services or activities. Different aggregations of the ratings and recommendations can be provided for an individual user (e.g., from all users, from my community, from my family, . . . ).

The location information module 210 can provide information regarding the location of the user and/or entity that provided the data image or other information. A Global Positioning Service (GPS) or another locating means can be employed to facilitate location information. GPS accuracy in urban areas is limited, and in a number of situations (e.g., interior spaces) is not generally available. Wi-Fi-based location solutions can be utilized to complete the location-gap and enable the various embodiments disclosed herein to work in a plurality of environments.

According to a further embodiment, the system 200 can verify the location of a user periodically through a plurality of resources. For example, the location of a user's mobile device can be resolved utilizing a location server. The device the user is using when information is provided to system 200 can actively track its location locally and periodically upload the location information. In another embodiment, the user can manually choose a location (e.g., "I am here") to create a named checkpoint.

The location information module 210 is configured to provide a location pivot for the images or documents based on where the images were taken or the documents were created, edited, etc. When a user has a location-enabled device (e.g., SmartPhone), a location-trail feature can record the device's location at a predetermined time interval or period (e.g., every 5 minutes). This trail can later be associated with the time-stamp on the file (e.g., picture, document) similar to data in an electronic picture storage medium or a directory of stored documents. The location information module 210 allows the user to virtually re-visit the trip in the original sequence and to associate other location-indexed information with each picture (or data) in the album. Keywords can automatically be associated with the picture, data, document, etc. to facilitate finding and viewing the information. It is simple to browse the directory structure by specifying a keyword that was previously associated with the image and/or data. In another embodiment, the browse can be based on the time and sequence of images and/or data.

The time information module 212 is configured to time-stamp the image, data, and/or other information and can operate separately or in conjunction with the location information module 210. The time information module 212 is further configured to provide a context to match the time of an event to the location of the event. For example, cameras can record the time a picture was taken and input the picture with the time-stamp to the system 200. This allows the user(s) a source of context for both personal and public data. According to another embodiment a position is not saved each time an event is recorded but rather a location-tracking service maintaining a "breadcrumb trail" of the user location at a pre-defined fixed interval (e.g., 5 minutes, 15 minutes, 30 minutes, . . . ). This information can later be utilized to determine the location of any time-stamped information, for example, a document edit timestamp can reveal where a specific change to a document was performed (and possibly prompt memory recollection of why an edit was made). The time-stamp information can also facilitate time-shifting functionality that allows a user to view not only current data, but also historical information and predicated future information. For example, the user can time-shift to see what the weather will be like tomorrow, based on historical forecasts or to time-shift to an earlier date to accurately observe how the weather behaved.

The location and time information can be utilized to confirm that someone was in a particular place at a particular time. For example, a non-repudiation service can sign a user certificate with the time and position of the user. This information can be verifiable (e.g., a wireless carrier's cell-tower or a commercial Wi-Fi Base station can offer this service). Drive-time algorithms can also provide that the user could have (or could not have) arrived at a destination before a certain time.

User location and/or time information should take in privacy and safety concerns as well as parental-control aspects. A plurality of means can be utilized to protect a user's privacy. These means can include allowing a user to be identified with an alias (in lieu of a real name) when contributing content. The user can choose to share personal content with all users or with a specific set of people (e.g., buddy list or named individuals).

A user can choose to share personal content and location for a specific set of time (e.g., location dithering, per-watcher dithering). For example, if a user has a meeting scheduled the user may send directions to the participants. The user can also give the attendees an internal map of the office or building in which the meeting is being held. Thus, the attendees might have not only a route to the meeting location but also the route to the user's office. Further, this information might be made accessible to the attendees only on the day of the meeting. The attendees can also be allowed access to the user's location during the hours of the meeting, in case the user is running late. This information can be configurable by the user. At other times, the user might only be located based on the neighborhood or city.

Another privacy concern revolves around street-level (and potentially other high-resolution, short range) images that can reveal personal information. Thus, various automated solutions for making the images anonymous should be employed. These solutions can include face-detection algorithms to look for and "dither" or blur people's faces, mitigating the occurrence of people finding their picture on-line. Other algorithms can be employed for detecting and removing license-plate numbers and other identifying criteria.

In addition, since the disclosed embodiments are predicated upon community contribution special considerations for controlling, mitigating, and dealing with spam, obscenities, pornography, malicious information, and the like should be taken into account. Eliminating all such data might not be possible, however, there are a number of strategies for mitigating the prevalence of such content.

Accordingly, users who rate, review, or contribute content should sign-in with a unique identification and/or password and the receiver component 202 can prohibit those to do not supply such information from inputting content. Those who are merely searching or viewing content (e.g., restaurants, events, locations, points-of-interest, . . . ) could either sign in or remain anonymous. A "virtual reputation" can be creating for a user who contributes content (including rating and reviewing content). This reputation can be based upon ratings of other users who have ranked such user. A user who has consistently contributed poor quality content may have a low virtual reputation. Such a user can be prohibited from uploading, reviewing, or rating further content.

For example, a user contributes content regarding a restaurant. If the content is reviewed and a predetermined number of other users provide ratings indicating that such content is spam, the content in question can be hidden and the contributor prohibited from contributing further content. The user can be provided the opportunity to explain the content. A system (e.g., virtual arbitration system) can be put into place to settle the issue whether the content is spam or not and whether the content should be permanently removed or if is should be redisplayed for viewing by others. In another embodiment, each user who contributes can have a raking associated with such user. A user who contributes spam or other malicious content can be issued demerit points. In addition, users who falsely accuse another can be issued demerit points. If a user falls below a certain raking due to such demerit points, they can be flagged and no longer permitted to post, upload, or provide content. It should be understood that the receiver component 202 can be configured with other dynamic checks and balances enabling the system to allow the community to self-regulate itself.

Figure 3:
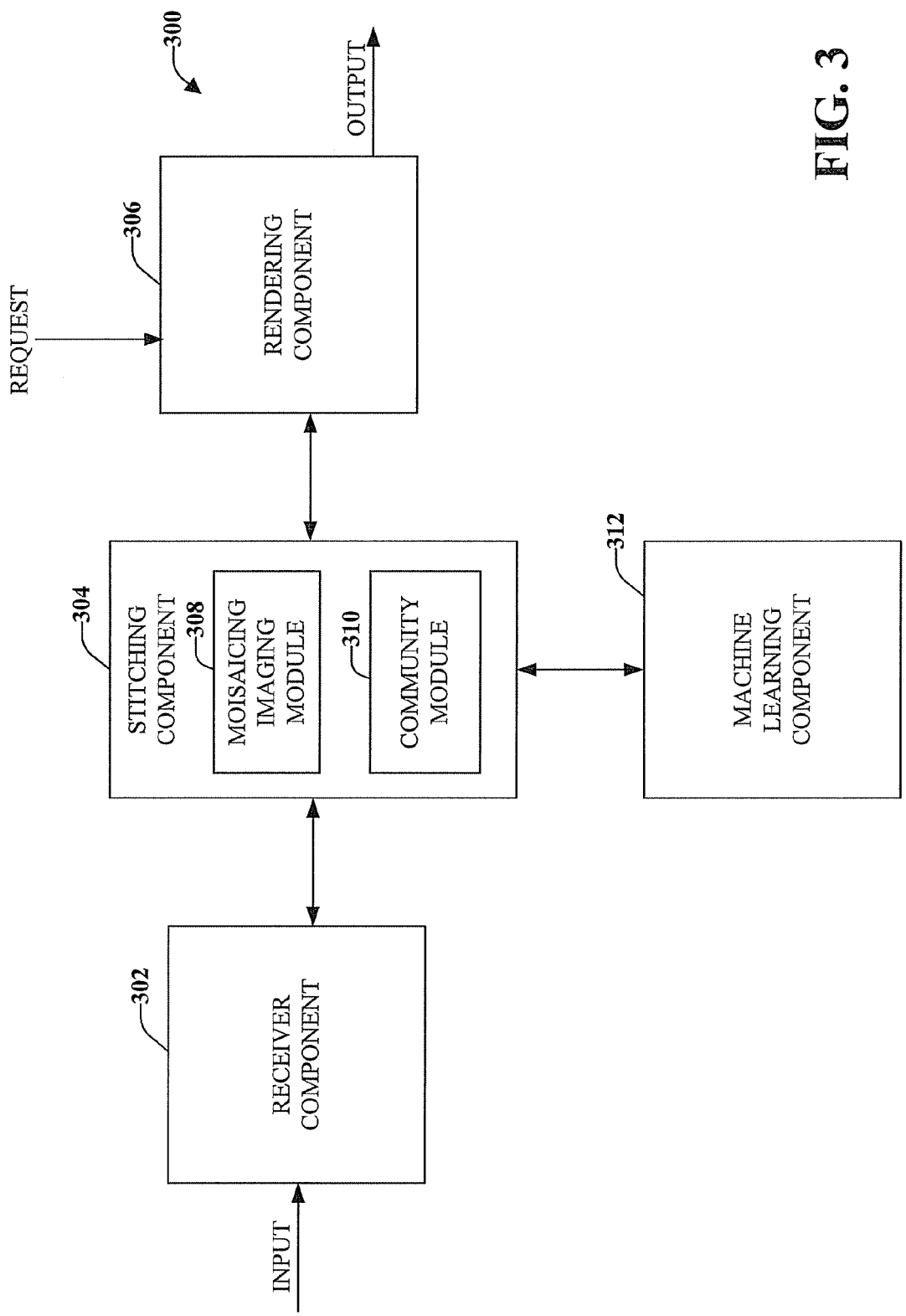
FIG. 3 illustrates a system that maintains a central repository of location-based information.

With reference now to FIG. 3, illustrated is a system 300 that maintains a central repository of location-based information. System 300 includes a receiver component 302 that facilitates user entry of location-based (and time-based) information. The location-based information is maintained in a stitching component 304 and transmitted to a rendering component 306 upon a user request for a subset of the location- (and time-) based information.

The stitching component 304 is configured to maintain the location-based information in one or more repositories through which the location-based information can be retrieved as if from a single repository. The stitching component 304 facilitates breaking down an image into stitchable squares or tiles, each rendered and downloaded independently. A code, such as HTML, combines the squares to show a seamless image. As the user pans and zooms, additional sections are downloaded.

The data collection or stitching component 304 can include a moisaicing-imaging module 308. Mosaicing imaging applies at a pixel level and provides mapping to physical locations. This allows a street side to be scanned such that the street, when viewed, has side streets connecting to such street. Both the main street and the side streets can be viewed at various angles including from a forty-five degree angle and from a top view. Mosaicing imaging also allows viewing of cultural objects and those objects, things, events, etc. associated with a neighborhood. It also allows a user to use pixel level mapping to view a physical location.

In a practical implementation, there is a tremendous amount of information available through the collection of a vast amount of image data from a plurality of sources. Obtaining a granular level viewing, such as a house, is simplified because the image collected is a geo-reference and the system knows where every pixel relating to the image data is located on earth. When a plurality of users provide image data and/or oblique images, the system identifies each pixel of the image and stitches all the images together to form a comprehensive data image.

The images received from the plurality of users may or may not be related, thus every point must be identified as it relates to real world experiences. This is similar to embedding on a clay model by setting an identification for every point on earth and providing an exact location of each point. There are at least three things going on at any point in time. The first is pictometry to collect the imagery (receiver component 302), which are all geo-referenced and included in the model. The second is mosaicing that makes one large function point out of the plurality of images. The last is a huge image that is compiled by taking each digital image and associated tiles and making them into stitchable parts. It is these stitchable parts or tiles that are put on a plurality of servers. Each tile is organized with a reference or identification indicator allowing the system 300 to locate each tile based on the identification associated with each tile. The stitching is applied to the map and provides reference labels as well as other identifying criteria. Further information regarding providing or serving up these large images quickly will be discussed in more detail below.

The stitching component 304 can include a community module 310 configured to maintain information received from a community of users. The community module 310 can find an entity (e.g., location, place, event . . . ) based on a community that recommends that particular entity. The community can be defined as persons listed in the user's instant messenger, frequent contacts, or other defined criteria. The community may also be a certain geographic region, such as a city, portion of a city, etc. An entity can be based upon a subset of all entities the user has saved, such as with a bookmark, or can be based on the entire spectra of entities that particular user has enjoyed. Thus, when a user visits, for example, a restaurant, and has liked the food, service, atmosphere, etc. the use can save the specifics of that restaurant as a bookmark and can further include user-defined descriptions, such as notes or recommended foods, etc. This provides a way for others to search for a particular entity based upon the user's saved bookmarks, provided such user is defined as a member of the other's community.

A community search can be broadened or narrowed depending on user requirements. The broadest spectrum is the entire community (city), a middle spectrum is a user's own community (frequent contacts), and the narrowest is associated with the specific user or that user's saved bookmarks. The user is able to go back and forth from narrowest to broadest search and additionally can search any spectrum between the narrowest and broadest. It is also possible for the user to request a search for, or based upon such user's contact(s), those contacts' contact(s), or those contacts' contacts' contact(s), etc. in an ever expanding and/or distant range of contacts away from the user.

The search can be conducted based upon inference, or artificial intelligence provided by a machine-learning component 312 that interfaces with the stitching component 304 or other components of the system 300. For example, a first user may have a preference for a particular restaurant and a second user has a similar, although not necessarily identical, preference. If the first user is unfamiliar with an area and/or not aware of similar restaurants such user might enjoy, a search can be conducted based on an inference using the second user's preferences. The search can be conducted utilizing user-defined criteria or system defined criteria based upon that user's known likes and dislikes, as previously entered by the user. An inference or machine-learning component 312 and/or engine can then search for additional users that have similar preferences, such as a second user. The system 300 can recommend suitable restaurants based upon an inference that the likes and dislikes of the two users are similar, even if the users do not know of each other and provided each user previously agreed that his/her information can be used in such a manner. Some of this inference can be based upon a social network, such as utilizing an instant messenger system as a social network.

An inference search can be based upon an inference of what another person would prefer. For example, a husband may want to take his wife out for a special occasion and has decided, since it is special, to do something his wife would prefer doing, rather than what he would prefer. In this instance the husband can search based upon his wife's preferences and his wife's community preference with no relationship to and/or combination with the husband's preference. This is basically a search to determine what another person would prefer without actually asking such person, which provides an element of surprise and/or good judgment. Another type of inference search can be based upon a combination of the preferences of two or more people. By combining the plurality of preferences an inference can be drawn about something both or all might enjoy doing together.

An inference engine (e.g., machine learning component 312) can provide a geographic inference search based upon time-based information and/or social network-based information. A training mode could be started with a seed model and as data is captured or pushed into the system 300 it can learn the preferences of the user. The system 300 or architecture can capture data relating to the places the user has previously viewed, searched for, or indicated in some manner a preference, and, based upon that data, infer that the user will be interested in a particular activity, such as a sport activity, a social activity, a business activity, etc. The preferences of the user are placed into large types or groupings of activities and by applying filters, the system can infer what that person may be interested in and drills down into a particular activity. Once the system 300 learns such user's preference the system 300 achieves an intelligence and can apply such user's preference in relationship to the community enabling faster and more accurate searches and recommendations.

Figure 4:
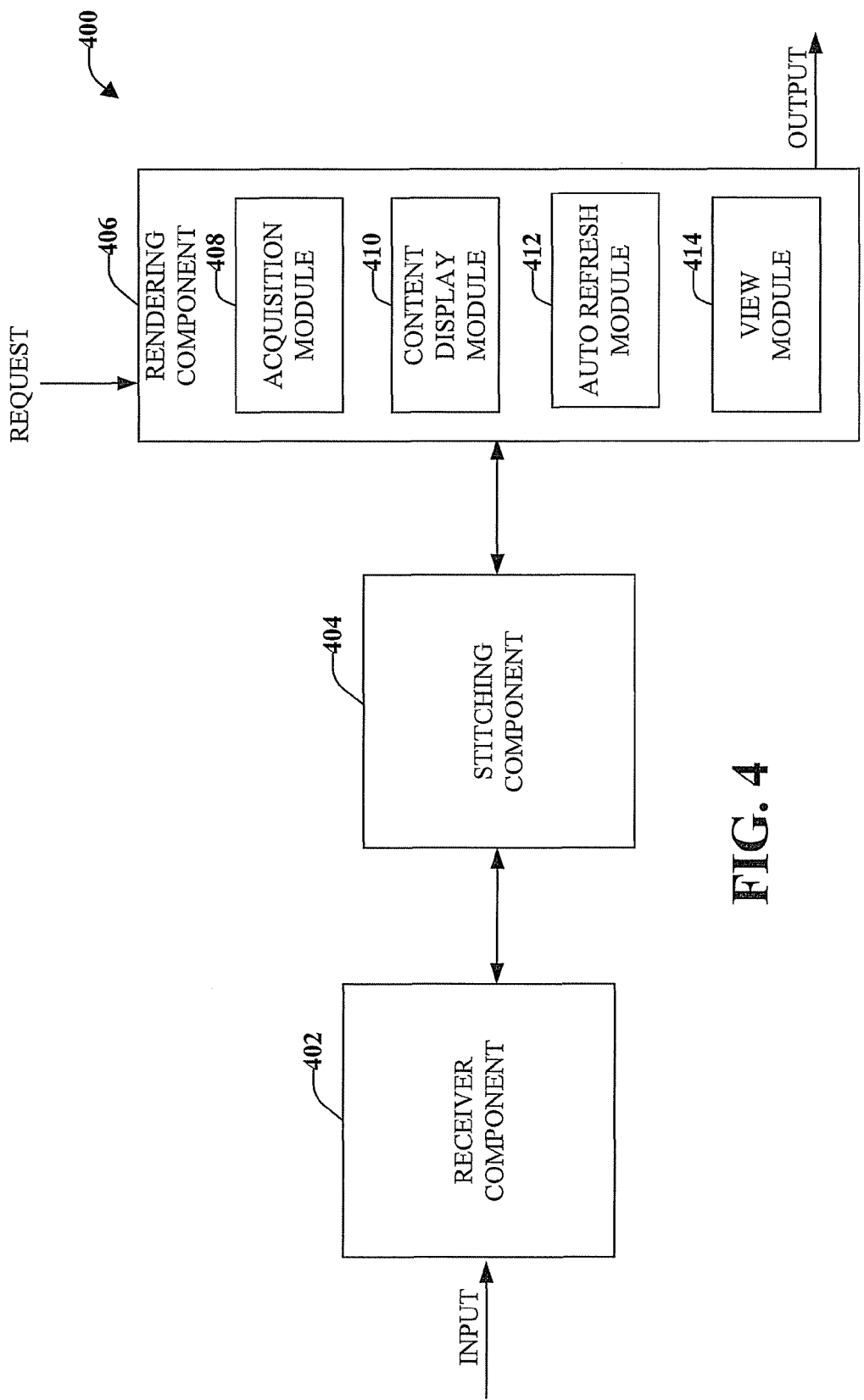
FIG. 4 illustrates a system for outputting map information to a plurality of users.

FIG. 4 illustrates a system 400 for outputting map information to a plurality of users. System 400 includes a receiver component 402 that receives data, images, and other information from a plurality of users. The data, images, and/or information is communicated to a stitching component 404 that maintains the data in a logical format allowing the data and images to be available for a plurality of users through an interaction with the rendering component 406. The rendering component 406 is configured to display map information and associated data though an interface between an acquisition module 408, a content display module 410, an auto refresh module 412, and a view module 414. It should be appreciated that less or more modules than those shown and described can be utilized in conjunction with or separate from the rendering component 406.

The acquisition module 408 is configured to receive map information to be displayed, which can include receiving a user request to view an area or place on a map. For example, the user can request to view a particular geographic area (e.g., city, street, building, address, . . . ), through a user interface. The map focal point can be based on the center of the screen, however, a user can also look at a specific entity or location, such as a restaurant, and/or certain accommodations associated with entities of that type. For example, a search can be performed for all Mexican restaurants that have a five star rating, a nice view, live music performance, serve alcoholic beverages, etc. Associated with the search results can be additional data including imagery, text, and/or voice data.

The content display module 410 is configured to render a subset of the map information in a display space or a viewing area (e.g., monitor, display, . . . ). The content display module 410 is also configured to render user interface controls so as to overlay the map information within the display space. The controls are rendered so as to be semi-transparent such that map information residing under the control(s) is viewable. In such a manner, a user can manipulate the user interface controls and at substantially the same time view the map contents and associated information.

By way of example and not limitation if a user wants to find all Starbucks® in Seattle as well as the different places available for parking in the area, the user can view both results together on the map. The user would enter a search, such as "Starbucks in Seattle" and/or "parking in Seattle." A search based on the user input criteria is performed by the system 400 and on the viewing page (map) both criteria, if both were entered, are shown and distinguished by, for example, different colors. The user can selectively turn each search criteria "on" or "off" individually for ease of clarification and distinction. Thus, if the user, having conducted the above search, only wants to see places to park, such user would select an "off" feature and the indicators for Starbucks® would be removed from view. The user is able to turn those features back "on" and they will reappear on the viewing screen.

In another example if the user, having conducted the above search, additionally or alternatively wants to find an Italian restaurant and an ATM machine, such user can enter search criteria, such as "Italian food in Seattle" and/or "ATM in Seattle." The system conducts the search and layers the results of the search with the results of the above search allowing viewing of all search criteria at a substantially similar time. This layering feature allows the different search features to be viewed together, with for example, different colors or other marking indications, such as flags, geometric figures, etc. Further information regarding the display overlay or laying function will be described below.

The auto refresh module 412 is configured to dynamically update the map displayed information as a function of cursor movement within the display space. A multiple or layering search can be done within a specified distance and/or geographic area, such as miles or city blocks, and can be limited to the portion, section, or area of the map that is in the viewing area. When the user "zooms in" a portion of the map to view a small section on the map in an enlarged view, the screen automatically refreshes and the search is automatically performed again but this time limited to the area of the map that has been enlarged. When the user moves the map around, such as moving north, south, etc. the search is automatically performed or auto refreshed for that new area as the map is moved, allowing for the indicators or controls to constantly change. This refreshing is performed autonomously by the system 400 without any necessary interaction from the user.

For example, a user can request the location of all museums with a city. Textual information regarding the museum name, address, phone number, hours of operation, etc. are displayed with a pointer or line indicating the specific location of the museum. If there are no museums in the requested area or if the user wants to broaden the search area, the user can "zoom out" to view a larger geographic area, such as the surrounding cities. The auto refresh module 412 automatically refreshes the data associated with the map such that the requested information is updated for the display area. In the above situation, additional museums may display while others, no longer in the viewing area, are removed from the display screen. The auto refresh component 412 mitigates the necessity of the user reinitiating the search after a "zoom in," "zoom out," or other command functions are complete.

The view component 414 is configured to provide a plurality of users the ability to view the map information from a plurality of viewing angles as well as viewing the map information in its format at some time in the past, future, and its current format. The user can control the view with a user control adjustment associated with a user interface. The view component 414 can render an oblique view of the map information. The map information can be viewed as a bird's eye angle, a top viewing angle, a perspective angle, a front viewing angle, a back-viewing angle, a downward trajectory-viewing angle, an upward trajectory viewing angle, etc. In this manner, an image can be viewed from a plurality of angles and directions.

A "nearby" search based on vicinity is available that facilitates searches for specific places, such as restaurants, parking areas, ATM machines, movie theaters, buildings, homes, etc. For example, the nearby search can find all ATM machines that are within a user-defined area or distance from a Starbucks®. In this way, the user is not only finding the specific locations for both "Starbucks" and "ATM machines" but the system 400 is limiting the search to return results for only those Starbucks® that are located near an ATM machine.

System 400 contains a large amount of data and the data should be in a format that allows a user to enter search criteria to easily retrieve the desired information. The information can be retrievable based upon a specific moment in time (past, present, future prediction) for which the user desires information. For example, the view module 414 can include a time component that is configured to provide a user the means to locate a particular place, thing, etc. at a particular time. As data is received by system 400 the data can be time stamped, either with the time received or with the time the information was captured by the inputting device. Thus, when a user selects a location and time combination, the user is presented with easily retrievable data in the format that is valuable to the user. For example, a user may want to view a location before a hurricane and also view the same location after the hurricane. System 400 allows such viewing and can tailor the information to a specific user request.

Figure 5:
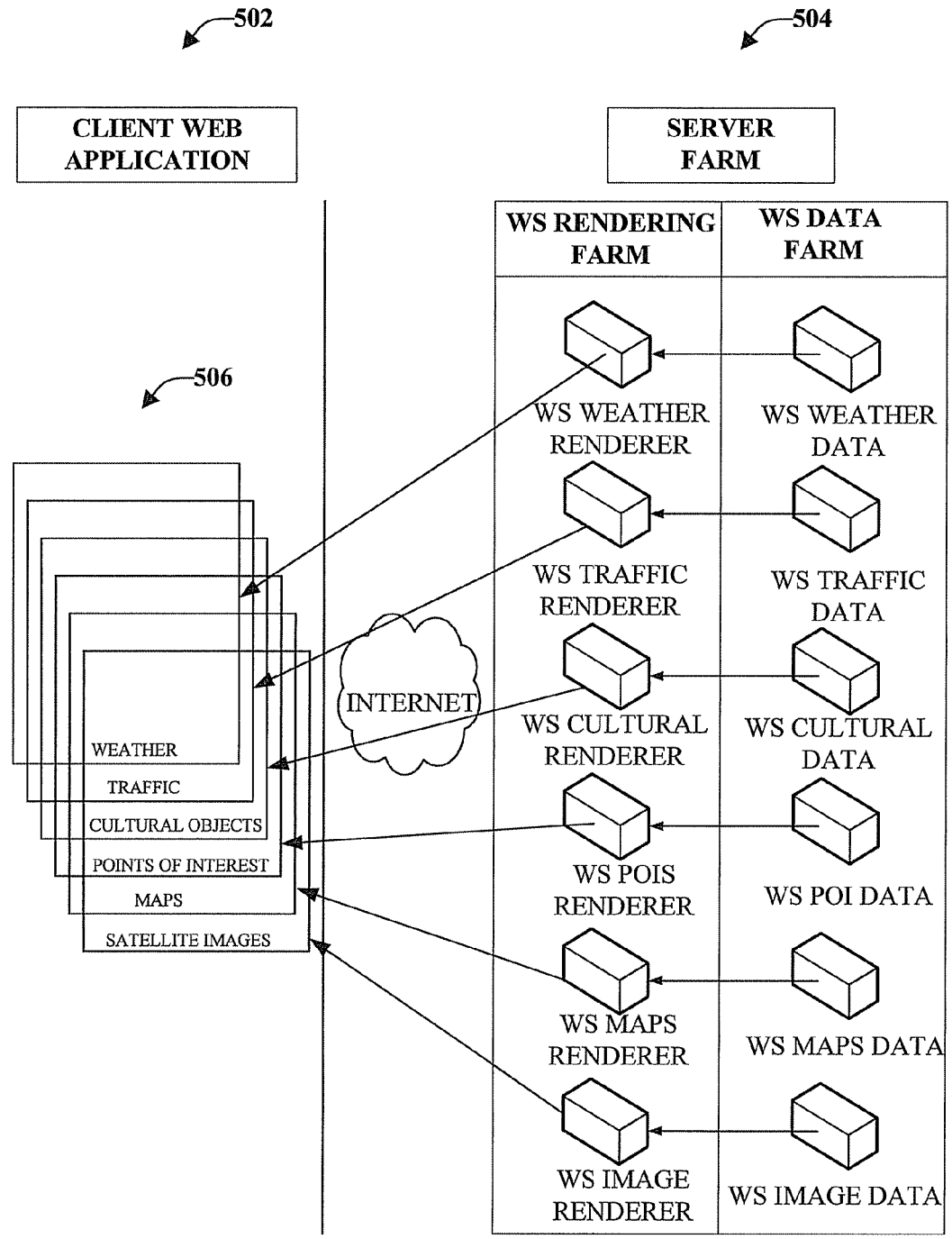
FIG. 5 illustrates components for creating mapping layers.

FIG. 5 illustrates components for creating mapping layers. As illustrated, a client web application 502 communicates with a server farm 504 through the Internet, for example, to request mapping information. The mapping information is split into independently downloaded tiles 506. As illustrated, each tile can represent different subject matter (e.g., weather, traffic, cultural object, points of interest, maps, satellite images). However, the tiles can represent different subject matter or a single subject matter can be distributed over more than one tile. A user can also configure personal tiles depending on the tiles that the user desires to view.

Figure 6:
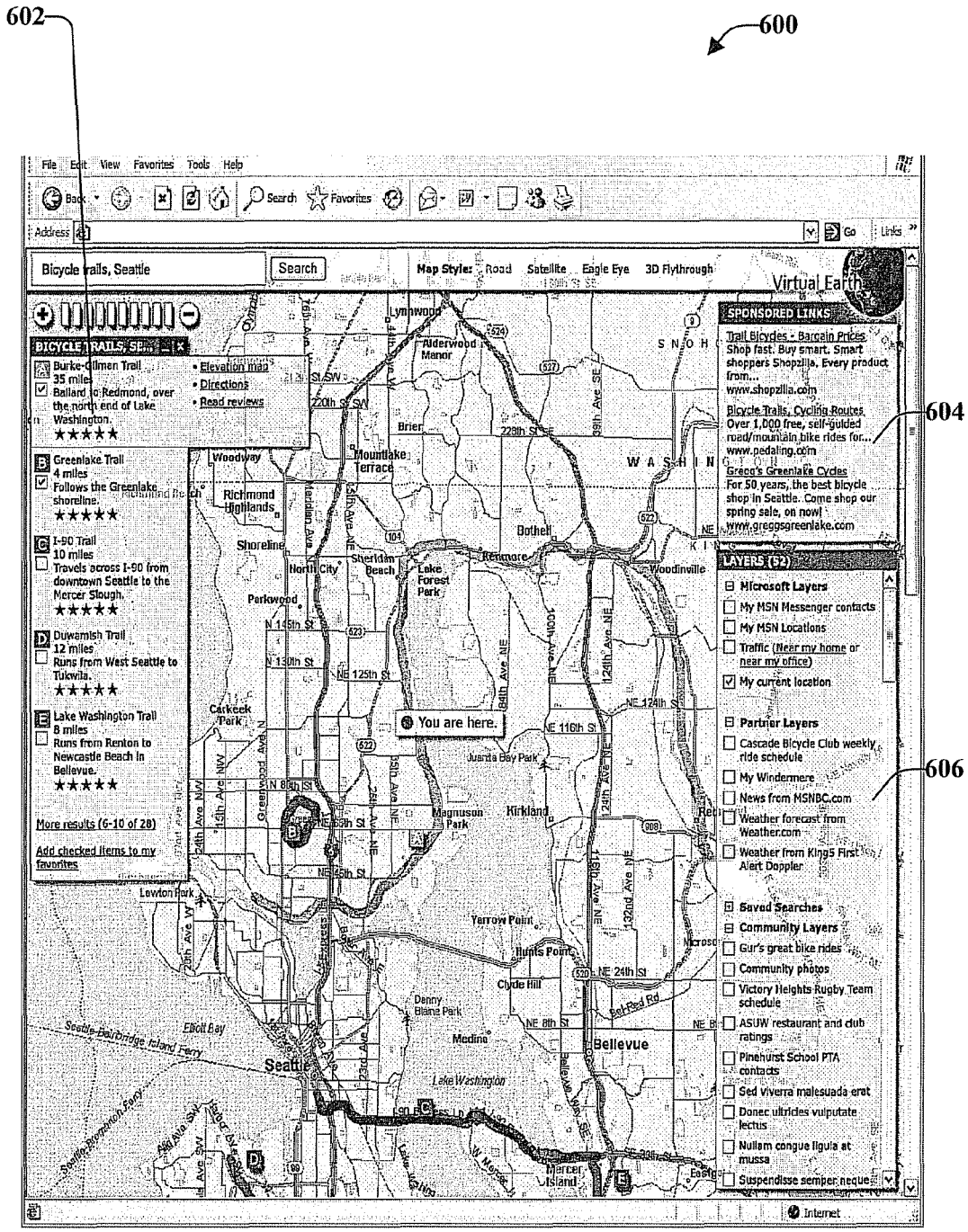
FIG. 6 illustrates an exemplary screen shot of a display that shows mapping information overlaid with user controls.

FIG. 6 illustrates an exemplary screen shot of a display 600 that shows mapping information overlaid with user controls. The different controls 602, 604, and 606 are placed on different layers and there is an intelligence associated with each control 602, 604, and 606. A layer captures a local augmentation of available information and the display provides a complex, multi-layers world made of raster, vector, cultural objects, moving elements, people, avatars, bots and other elements. Layers are basically a set of geo-coded entities (e.g., points, lines, polygons) and their extent and attributes (e.g., name, photo, URLs, . . . ). Examples of layers include: Bellevue Square Mall, Best fishing on Snake River, Windermere publishes home listings.

Initial layers can be automatically provided to give the user a search that is meaningful in the absence of customized layers. Such initial layers can include Wi-Fi hotspots, movie times, etc. from, for example, users (end user publishers, commercial publishers, . . . ). Individual users can create personal layers (e.g., "my house") or raster upload (e.g., "Woodland Park Zoo"). Text data files can be uploaded for multiple points (e.g., "my fishing holes", "Starbucks® locations"). It should be appreciated that a set of layers, such as top and bottom, might be unavailable for user modification to ensure control of the viewing display.

Selection of layers can be through a palette or a search engine and can be categorized based upon a user-defined category. Alternatively or in addition, layers can be recommended based on a user usage and/or viewing patterns. Users can rate and review layers through an interactive process. The top layer associated with each search can be based upon a layer popularity trend and can be related to user ratings and user reviews. If a particular layer is not relative to the current map displayed, the layer can be hidden. The user interface provides each layer a different rendering mechanism (e.g., raster, URL, through a web service method).

The value of layers is unique for each user. An end user (individual) can utilize layers to find the best local knowledge when needed. An end user publisher can utilize layers and receive compensation for such publisher's knowledge. A commercial content publisher can utilize layers to provide advertising and information to a plurality of customers.

Figure 7:
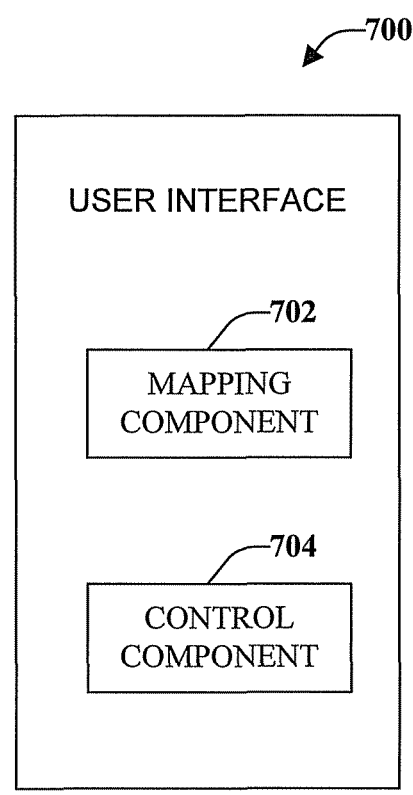
FIG. 7 illustrates an exemplary schematic of user interface components.

FIG. 7 illustrates a schematic representation of an exemplary user interface 700 utilized with the embodiments disclosed herein. The user interface 700 can include a mapping component 702 and a control component 704. The mapping component 702 is configured to view or cover a specific geographic area and can alter the viewing angle of the map to provide a user with a unique viewing experience.

A viewing angle of the map can be an oblique view wherein the appearance of the map can be twisted or turned about forty-five degrees allowing the user to view the map from at least four viewpoints (e.g. north, south, east, and west). There are a plurality of other viewing angles available including a panoramic view and/or a three-dimension view of the map. The map can be angled at forty-five degrees allowing viewing of the sides of buildings and the roofs of buildings, if desired. This is referred to as a pictometry image and allows the user to switch from an over-view or top-view to an oblique view, etc. and the user can switch back and forth between the various types of view. The oblique view allows the user to choose a minimum of two rotation angles that can be, for example, based upon the street directions. The user may also import rotations providing maximum flexibility and a unique user experience.

A user can enter a request for a specific geographic area, such as Fort Yates, N. Dak. After initiation of the search, the mapping component 702 retrieves or receives the requested location and displays the particular place (e.g., city, street, address, building, house, . . . ). The user can further define the search, such as to search for Sitting Bull College in Fort Yates, N. Dak. In such a manner, the user can continuously refine the search. Once the desired object to view is displayed, the user can alter the viewing angle to view the object to achieve a different perspective and/or to achieve a perspective of the actual size, shape, construction, etc. of the object. The user can alter the view utilizing controls associated with the control component 704.

The map can be the background or centerpiece of the viewing area and/or cover the entire page with the things associated with the map located on, or overlaying the map. The controls associated with the map and control component 704 can be translucent to allow viewing of both the map and the controls concurrently. Thus, the control component 704 is translucent and overlaid on top of the mapping component 702 to allow a visual representation of both the mapping component 702 and the control component 704 at a substantially similar time.

The control component 704 can be configured to display only the required or most relevant data. There is a vast amount of data that can be displayed for a small strip mall or high-rise building as dozens of businesses can be listed in the area. In addition, a plurality of user may leave GeoNotes on hotspots within that area. Some techniques that can be utilized to limit the information include a NearMe button that provides a dropdown menu that is customized for a user that has signed on. The user can chose or pick a saved location from the drop down menu, such as Home, Work, Tony's School, Along My Daily Commute, etc.

Other techniques include providing each list of data with an element of community filtering, e.g., "only show me businesses that are 3-star rated or above." This enables a filtering of results. Another approach can be grouping results based on community ratings. The user can utilize a slider control or bar or other techniques to control how much the community choices affect the displayed result. Another technique can be a "Today's Destinations" tray that allows for adding and removing of listings from the map view.

Profiles can control the filtering of the results lists. For example, profiles could be a "soccer mom", "teenage boy", or "photo enthusiasts". These profiles can initially be chosen by the user but modified over time based on the user's behavior. Users can then publish their profiles for other to view and use. The other user(s) could then pick the "photo enthusiast" profile to perform searches when searching for a good location to take pictures of the Space Needles.

Another technique to limit the information to only relevant or requested data can include displaying relevant data sources on the map view based on the category of the user search. For example, when a user searches for "Football in Seattle", in addition to the Seahawks home page and SeattlePI football newspaper section, the system could also surface local event listing, and fields.

The disclosed embodiments are not limited to consumer applications and can encompass business, industry, government, law enforcement, etc. For example, in a law enforcement application a police officer can log in as "user" with an associated user name and possible even a password. The officer can be presented with a case log listing all the projects (ongoing investigations) with which such officer is currently engaged. It is possible that an expanded listing overlaying the map can show a case log of all activities with which the department, city, county, state, etc. has listed as ongoing or current investigations. The officer can initiate a search for a particular person (suspect) in an investigation and the last known location for such person can be presented to the officer. The last known location can be based on various collected data, such as user input, user statistics, or other collection means. In such a way, law enforcement officers have a better chance of tracking down persons based on dynamic information through autonomous data gathering.

Layering aspects of the invention are included wherein the controls are overlaid and placed on top of or in front of the map allowing the user to perceive the controls and other information in combination with the map. The controls and other information are translucent thereby allowing viewing of the detail underneath the controls/information and viewing of both the map and controls/information concurrently. In a layering application based on the above example, a police dispatcher may have a map of the police district showing the location of all officers, cars, etc. The police dispatcher would have the ability to track each officer as well as the ability to individually turn on/off the controls that allow viewing/tracking of each police car.

Figure 8:
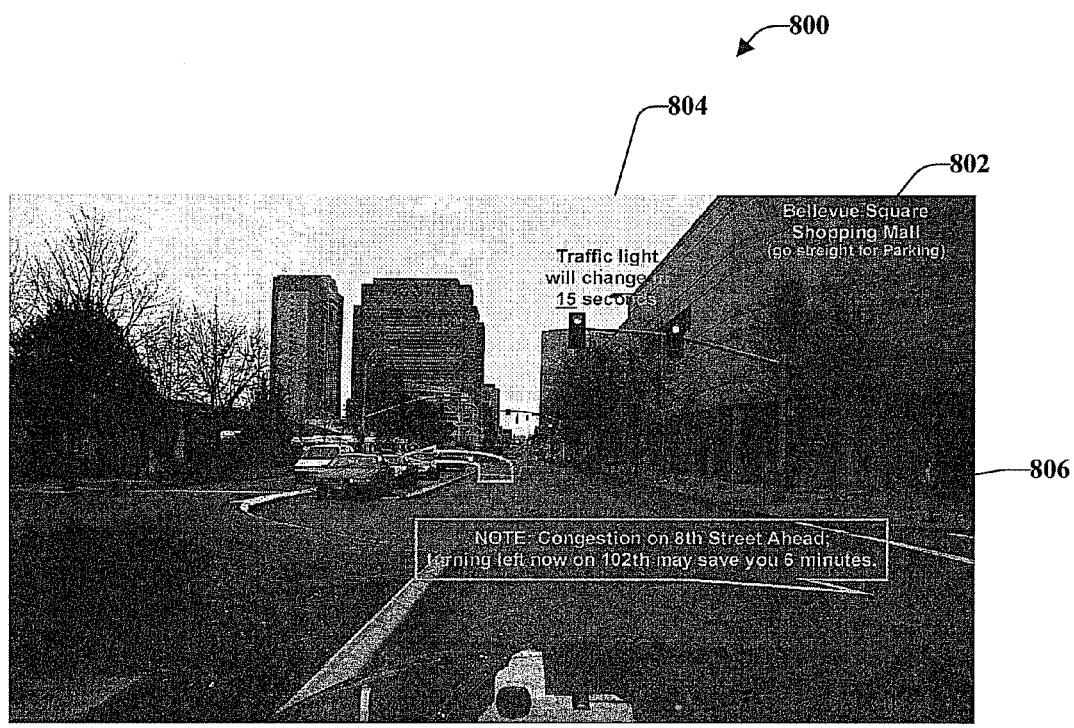
FIG. 8 illustrates an exemplary screen shot of the disclosed embodiments utilized in an automotive application.

FIG. 8 illustrates an exemplary screen shot 800 of the disclosed embodiments utilized in an automotive application. Laser projection displays and head-tracking equipment (to determine what the driver is looking at) can be "drawn" literally on top of the real world (e.g., windshield). For example, instead of hunting for the driving destination, when the navigation system claims "you have reached . . . " an illustration can be drawn (on the windshield) with an indicator 802 marking the spot, on the actual location as perceived through the windshield. Thus providing a better visualization system than other navigation solutions (e.g., voice prompting, removing eyes from road to view a screen inside the car).

The display on the windshield should not cover the entire windshield for safety, thus the laser projector can mechanically lack this capacity. Non-traffic-related information above a predetermined speed threshold (e.g., 35 mph, 55 mph) can be disabled. This non-traffic related information can include information such as remaining fuel in car and projected remaining driving distance, the name of the building the car is near, etc. In addition, the system upon noting a low-fuel indicator, can automatically search for the area's best prices for gasoline and minimize re-route time. The price information can be supplied by the local gas stations (and other retail establishments can supply information regarding their particular goods, services, etc.).

Car-to-car communications (e.g., ad-hoc networking with Wi-Fi's range of around 150 feet and a GPS) can be utilized for active safety support. These communications can include information such as "slow down now, car in front turning."

Other data can be obtained by discovering that near-by entities have APIs that can be queried dynamically. For example, a municipal traffic center might be computerized and the current wait time for a traffic signal can be computed, shown at 804. In another situation, the system can analyze the current route for traffic and notify the user that the system determined that an alternate route might be quicker.

To support the traffic service and information, a community traffic service can be utilized where people who subscribe to traffic information also share their traffic. For example, a driver can have a SmartPhone device with a GPS and some WAN connectivity (e.g., GPRS or Generation WAN technologies). As the driver drives, the driver's speed is compared to the speed attribute of the road-segment being driven on. If the speed is slower (e.g., by 25%) the device can report the road-segment identifier and the actual speed to a traffic service (using appropriate privacy considerations).

Other devices subscribed to the service and in the same general area subscribe to their route segments. This can relate to a particular time and known route that the user will be taking. A filter can be utilized so that the user receives data about only those road segments where the other device's attributed speed and reported speed is different (e.g., 25%). The system, utilizing mapping information can guide the user around the slow spots, saving time and gasoline. An example of such a display is shown at 806.

In alternate embodiments, information about a driver's driving habits can be collected and the driver provided a virtual score. This score can take into various considerations (e.g., driving speeds, traffic light habits, . . . ). The score can be utilized to provide the driver with better car insurance rates, through a participating insurer. In another embodiment, urban planners can receive anonymous patterns to better plan road repair and build-up. Archived traffic data can be analyzed to understand trends and provide valuable information to local municipalities and planning agencies.

Figure 9:
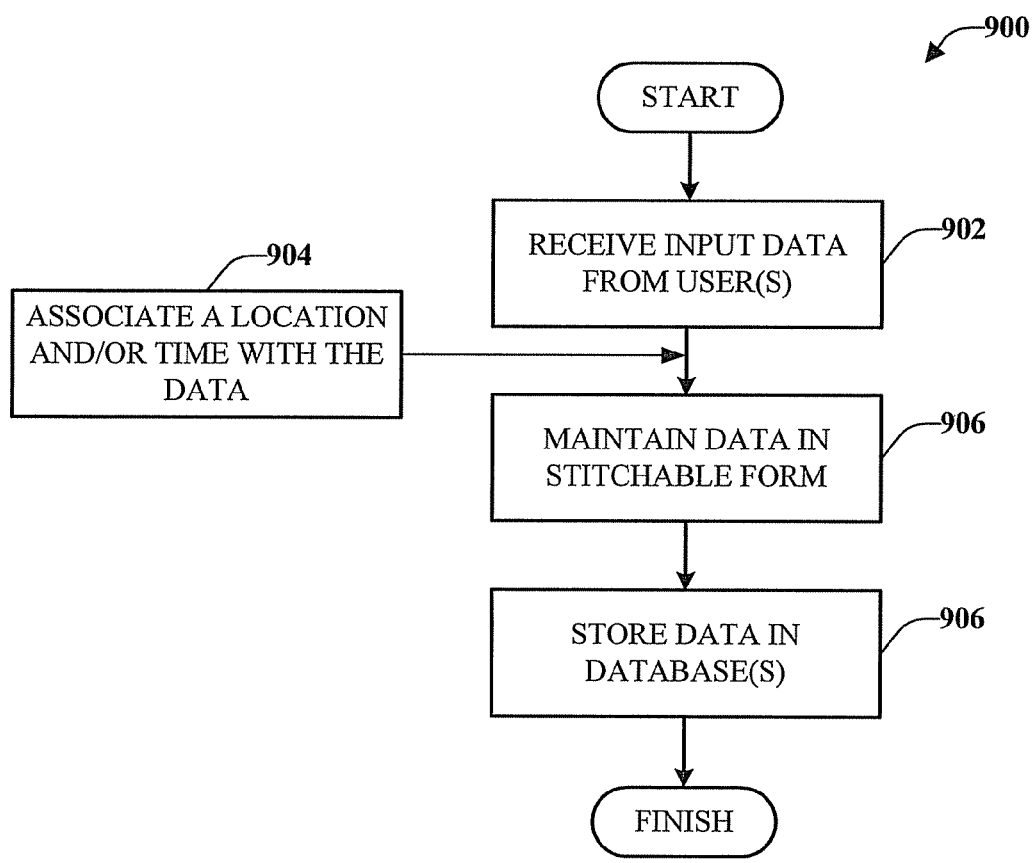
FIG. 9 illustrates a methodology for receiving input data from one or more users.

With reference now to FIG. 9, illustrated is a methodology 900 for receiving input data from one or more users. While, for purposes of simplicity of explanation, the methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

The method 900 begins, at 902, where input data is received from a plurality of users and/or entities. The data can be pictures, text, sound or other data associated with an object, place, person, etc. At 904, a location and/or time can be associated with the input data. This information can be provided by, for example, the user device. The location and/or time can provide context to the images, data, or information. Much of the data received will be isolated and not in context with other data received. Thus, at 906, the data placed in stitchable form. The data in stitchable form is then maintained or stored in one or more databases, at 908, wherein the data will be provided to one or more users upon request.

Many applications can be location-enabled by the disclosed embodiment(s) including news events, office related information, shopping, city guides, vacations. Examples of each type of application and available data are detailed below and the disclosed embodiment(s) are not meant to limited to the following examples.

News events can be clustered by location on a globe. As a user reads about a tsunami in Asia, the user can see on a map the other locations that the tsunami hit and/or read news articles about those locations. The user can view before and after aerial imagery of the affected locations. For sporting events a user can see that a cluster of Super Bowl articles appeared in Philadelphia (Eagles), Boston (New England Patriots), and Jacksonville (location of the Super Bowl). The user can easily find and read what local newspapers and national newspapers are reporting about the match-up or other related stories.

Office events allow a mobile worker to edit documents on a business trip. The disclosed embodiments allow the worker to geocode (e.g. latitude, longitude, altitude, heading, speed, acceleration) the worker's documents, e-mail, meetings, etc. The user can then view the work performed while on the business trip. This can range from meetings attended, documents and e-mails written, reviewed, edited, presentations given, notes taken during the trip, etc. Smart Tags can also be supported in an office event situation, for example. This allows the location(s) of an email or document to automatically be recognized with smart tags to get other content the user created around that location (e.g., directions to and from it, . . . ).

The disclosed embodiments allow a user to not only shop on-line but also to view the object and see how it really looks, etc. By knowing the user's location, the user can be provided with the names and locations of the nearest stores that have the item(s) in stock. If the user is shopping for a cell phone, for example, a suggestion can be provided indicating the best cell phone service provider based on carrier coverage maps that take into consideration historical information regarding the locations the user has visited in the past. Auction can be location-enabled to show a user auction resulted sorted by distance from the user (e.g., nearby search).

City guides can be customized for a user's interests. If a user has repeatedly visited a restaurant, pub, store, etc. the user's affinity for that location is remembered. This information, combined with collaborative filtering techniques can be utilized to suggest other places the user may wish to visit. The user is able to layer this information with editorial comments onto a personal version of the disclosed embodiments.

In a vacation scenario, a user may wish to view the destination before deciding on the destination or before actually traveling there. The disclosed embodiments enable a 3D (or other dimensional) street level immersive walk-through. This allows the user to virtually walk up to every hotel (or other place) located in the destination and experience what it would be like there. Thus, a Space-to-Street-to-Interior-Spaces concept is achieved.

In another embodiment, the request for information can be based on viewing contacts by their logical distance. Different pivots on location-context can be utilized, viewing each contact by city, state, or county. When the location of a contact changes, the user can be notified by various means including a pop-up text message.

Figure 10:
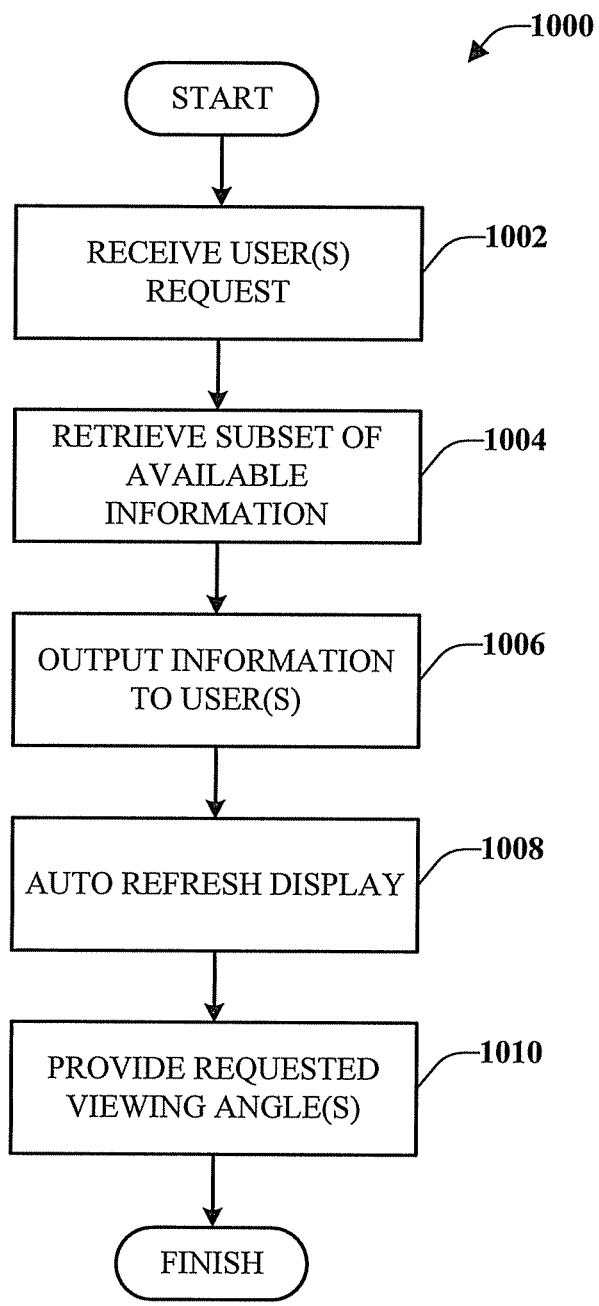
FIG. 10 illustrates a methodology for providing a user with requested mapping data.

With reference now to FIG. 10, illustrated is a methodology 1000 for providing a user with requested mapping data. The method 1000 begins at 1002, where one or more user(s) requests map information. The request can be received from a plurality of users at substantially the same time. The request can also be for a plurality of mapping locations. When this request is received, a subset of available information is retrieved, at 1004. The subset of available information can be maintained on one or more databases or servers. The information is output to the user(s), at 1006, on a display. The display can be a map showing the location and can show additional information, including names of streets, landmarks, requested locations, etc. As the user views the information on the screen, the user can move around on the display surface, using the cursor, to manipulate the map by altering its direction or the zooming level. As the user manipulates the display, the display is automatically refreshed to continuously provide the user with the requested data, mitigating the need for the user having to reenter the search criteria and/or reinitiate the search. A different viewing angle is provided based upon a user request. For example, the user can request a bird's eye view, a front-view, a trajectory view, etc. Thus, the user can virtually walk or experience the location viewed on the display area.

Figure 11:
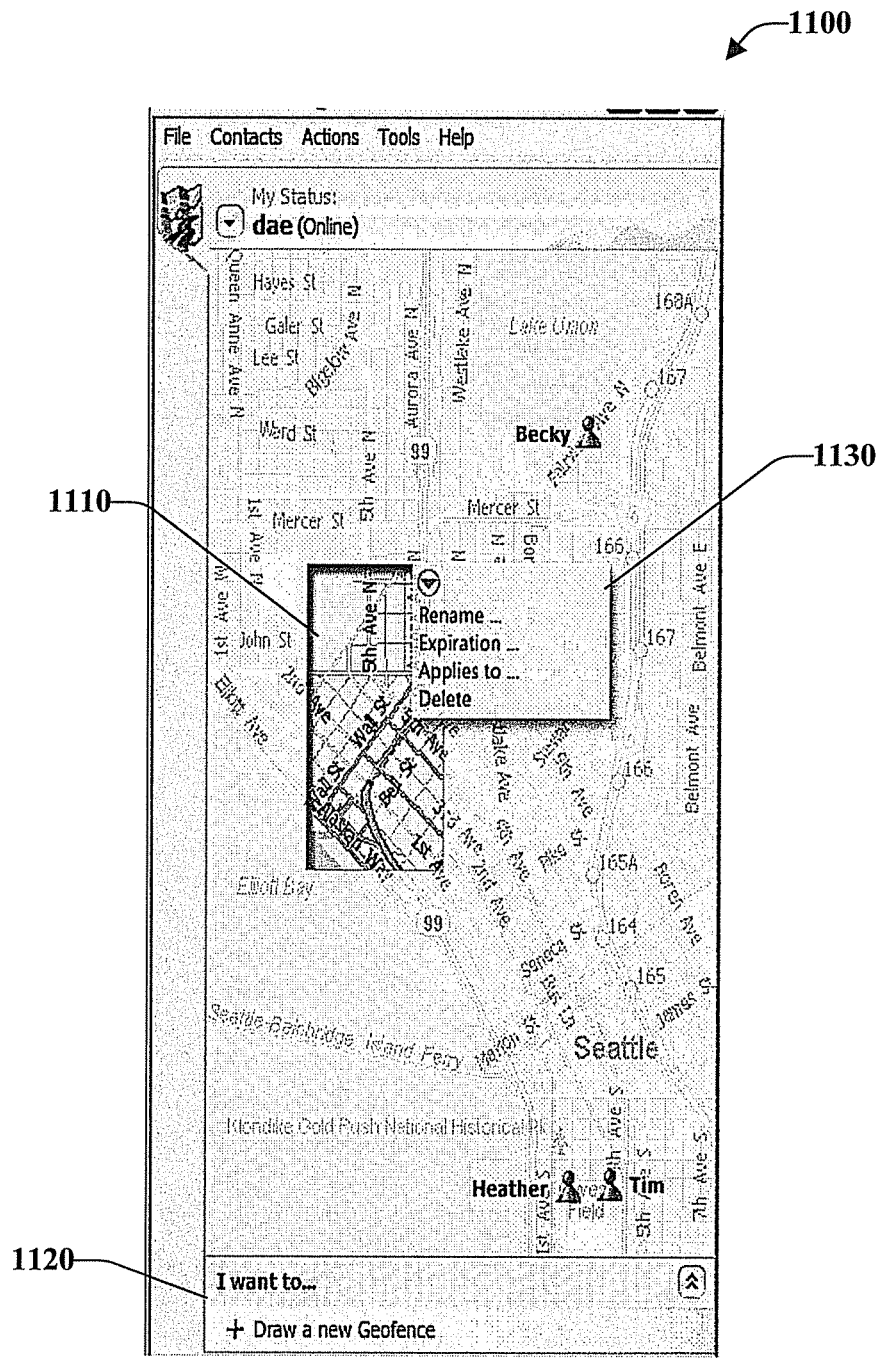
FIG. 11 illustrates a screen shot of a map with overlay controls and a Geo-fence according to the disclosed embodiments.

Alternatively or in addition, instead of listing contacts by their presence state or location, they can be shown on a map 1100 as illustrated in FIG. 11. The user can create a Geo-fence 1110 or section utilizing a control 1120 (associated with a control component) on the display space. The Geo-fence 1110 enables the system to notify the user when a contact enters the specific area within the Geo-fence 1110. The Geo-fence 1110 can be customized 1130 to expire after a set time or set to look for specific contacts. For example, the user may create a Geo-fence to find someone to go to lunch with but does not care if contacts come nearby after 2 p.m. It should be understood that while a rectangular Geo-fence 1110 is illustrated, non-rectangular and logical (e.g., College Campus) Geo-fences can be utilized and supported with the disclosed embodiments.

In another embodiment, the Geo-fence 1110 can be automatically created by the system. For example, if there is a meeting scheduled with people coming from other locations, the system can Geo-fence the area around the meeting and intelligently notify the user when it is time to go to the meeting area. Geo-fences can support a plurality of types of objects, including dynamic and transient objects (e.g., notify me when <x> is nearby" is a Geo-fence around <me>).

In another embodiment, location-based services can be added in-session. For example, if a group of users wants to meet for lunch and there is a time/distance constraint, the system can determine and create a drive-time zone based on the location of the contacts. This zone can be displayed to the users showing only the targeted search results within that zone. The system can create the zone by monitoring messages between the contacts and certain trigger words or phrase (e.g., "Lunch", "Chinese", "can't leave before 11:45", "be back by 1", "within a 15 minutes drive") can be utilized to auto-create the search query and results while the users are conversing.

In the above embodiments, the viewers can move around, drill in, rate objects, add/remove data views, time-shift, etc. the displayed information. Once the destination is chosen, each user can be presented with unique driving instructions. Additionally, each user can be presented with a personal "latest time to leave" estimation.

Figure 12:
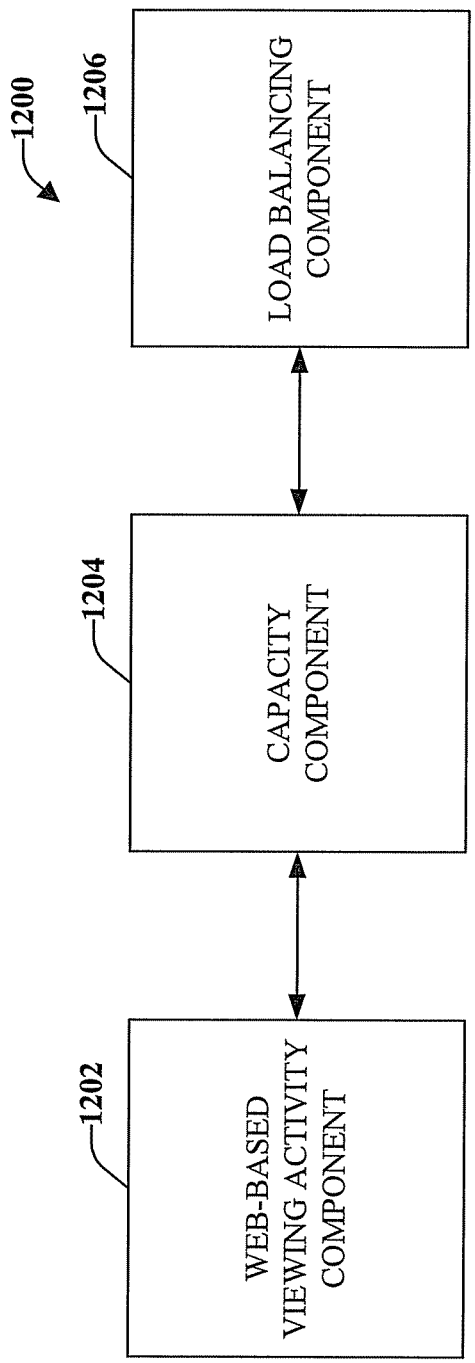
FIG. 12 illustrates a system for serving up large images quickly.

FIG. 12 illustrates a system 1200 for serving up (obtaining and displaying) large images quickly. Due to the vast amount of data available, a means to provide a user information on demand should be employed. System 1200 includes a web-based viewing activity component 1202 that interfaces with a capacity component 1204 and a load-balancing component 1206. The web-based viewing component 1202 is configured to determine a level of web-based viewing activity associated with a particular geographic location. The capacity component 1204 is configured to determine an available capacity to render images associated with the particular geographic location. The load-balancing component 1206 dynamically redistributes data associated with the images to be rendered as a function of image size and the viewing activity.

At times there are unpredictable events that occur and many people quickly become interested in viewing a particular event/place/location at a substantially similar time, referred to as "HOTNESS." The number of people attempting to view a particular area determines how many servers and how much capacity will be consumed by this interest. In order to ensure that all interested people can view a similar event at substantially the same time, a quick forecast of what should be available is determined as well as the means to acquire the requirements. Thus, the HOTNESS requirements are determined by a factor of the population plus tourism multiplied by an unforeseen event (or foreseen event) and can be expressed as:

$$HOTNESS=[(population+tourism)*unknown\ event]$$

Population is predictable and remains fairly constant over time, although the dynamics of that population are consistently changing. Tourism shifts over time but can be approximated, such as for known events (e.g., Olympics, sporting-events, . . . ). When the unknown event occurs (e.g., 9/11, tsunami, hurricane . . . ) that particular area may get "hot" because many people are trying to view that event (and associated location) at a substantially similar time. For example, there might be a thousand servers serving up images, the system 1200 can move or redistribute the data images to ensure that when an unknown event occurs the areas that are "hot" are on the largest amount of these servers that can be cached. There are two aspects associated with providing resources for hot zones; a naming scheme based on a quadrant and a technical architecture that can serve these images very quickly.

Figure 13:
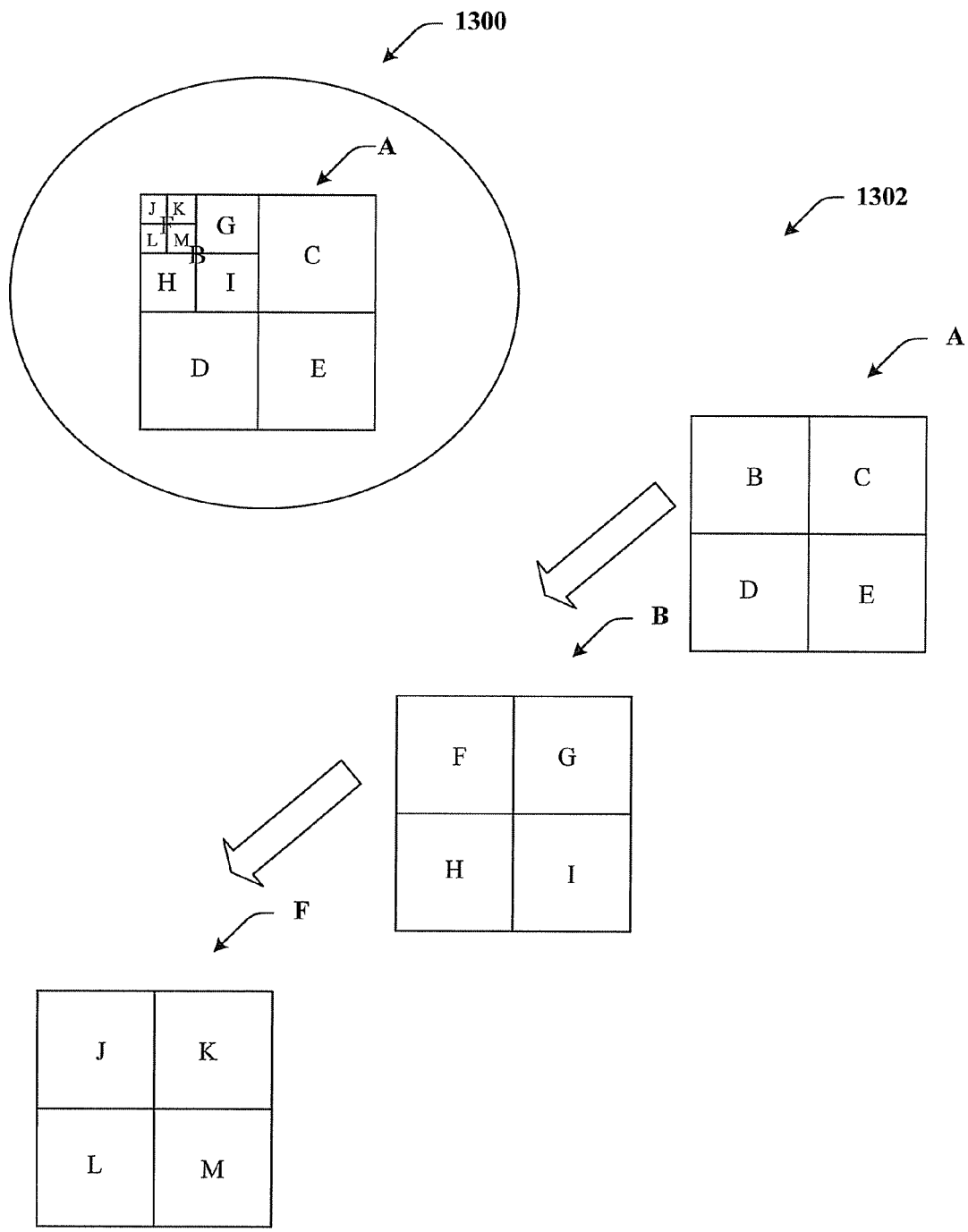
FIG. 13 illustrates a system for serving up large images utilizing a naming convention.

In a naming convention, the world is split into quadrants that are broken down into smaller and smaller quadrants or levels and can go from level 1 (or A) to about level 14 (or N) and beyond. FIG. 13 illustrates such a naming convention. At 1300 quadrant A is broken in quadrants B though M. An enlarged view of each quadrant is shown at 1302, where quadrant A is broken down into quadrants B, C, D, and E. Quadrant B is shown in enlarged view and broken into quadrants F, G, H, and I. Quadrant F is shown enlarged and broken out into quadrants J, K, L, and M. This process can continue in a similar manner providing greater and greater detail as desired.

The system can take for granted that at any given time the client or user asking for a particular set of tiles or quadrants knows how to ask the system for that quadrant in language that the system can understand. For example, if a user desires to view quadrant M, the user provides a request similar to the following:

TILE ID M.F.B.A.IMAGE.VE.COM

The user asks for four elements associated with the four quadrants in ascending order (which are M, F, B, and A in this example). At around the N and O level (not shown) there are billions of grades, so the Domain Name Server (DNS) name space can becomes large, however, the "hot" spot is actually small and segmented. There is usually no more than one hot spot in the same town or city and the entire world will not usually become hot at substantially the same time, so the lens of what people are trying to view is focused. Even in New York, hot spots occur only in selective areas. Additionally, hot spots remain hot only from a limited amount of time and thereafter they stop being "hot" and fall back to a normal and/or cold range.

Although the user is making the full request, as illustrated above, the DNS naming scheme is only concerned with about two of the entries. For the above entry what the system is acknowledging is:

*.B.A where * is a DNS wildcard and "B" and "A" are quadrants. The DNS wildcard indicates that the system is not concerned with the level of detail the user is requesting and the system generally looks for the two larger quadrants, provides an image for that particular area, and is resolved into a set of IP addresses.

In further detail, based upon the above request, there can be two IP addresses, indicating that the quadrant is spread across two machines or servers. When disaster happens (unforeseen event) and sector or quadrant K, for example, becomes extremely hot and a plurality of people want to view that quadrant at a similar time, the system looks at the graphic and determines that the hot area is:

TILE [K.F.B.A] IMAGE

The system can identify this as the hot area by counting the number of requests over a given time and making a determination that the number of requests has risen exponentially or based on other criteria. The system can copy the information for quadrant K, independent of the information of the other quadrants. The data/images for quadrant K is "slide across" other machines to expand the number of machines that have the data. This means that now there are more than two IP address and the new DNS entry (K.F.B.A) can resolve into a larger number of addresses, such as sixteen, for example. This allows sixteen machines or servers to service the "hot" spot requests. The system will be able to respond to the increase and dynamically shift the traffic around. Within minutes of detecting the "hot" spot, the data begins moving in a dynamic load balancing (which server to go to) fashion and re-slides the data depending on the amount of requests, or required granularity or depth of viewing.

Figure 14:
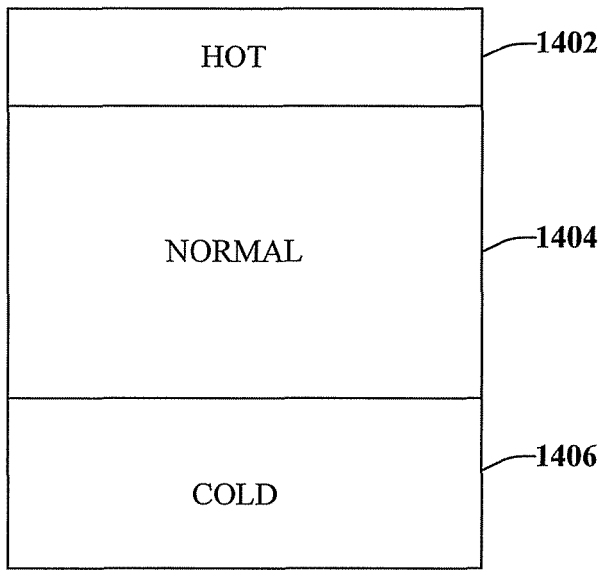
FIG. 14 illustrates a depiction of zones in which images, data, etc. can be associated.

Referring to FIG. 14, illustrated is a depiction of zones in which images, data, etc. can be associated. The system can take a sample of the number of incoming requests from users to determine the level of action for each quadrant. Based on the action level, each quadrant is associated with one of three segments: hot 1402, normal 1404, and cold 1406. Hot 1402 occurs when a large number of viewers request a data image of a particular quadrant. Cold 1406 is a quadrant that has few or no viewing requests. The range between hot 1402 and cold 1406 is the normal range 1404 and is the zone that contains the largest amount of data. Periodically the system removes the cold segments from the cluster to maintain memory capacity for the hot and normal segments. By way of example, the segments representing the United States can consumer over half a gigabyte of memory, thus, the system must intelligently decide what segments to dump to serve up images quickly.

Each entry in a quadrant has a counter that determines the level of normal 1404 or cold 1406. When the above algorithm decides an event has occurred (hotness) a determination of which quadrant to remove is made and also a determination as to which data needs to be sent or slid to a plurality of other machines. The best choices are machines, which are storing data from cold segments 1406 because these are the machines that generally have the least amount of activity and thus, surplus memory capacity. The cold imagery can be dumped off these machines, provided the scaling does not drop below two machines. At any time, there should be two machines that have the information, for redundancy purposes, and the data should not be deleted. If needed in the future, this data can be rescaled to more than two machines. Since copying data takes time, the system will not necessarily actively copy the data but will use a volume shuttle service (VSS) that will only copy data when they are actually touched, the first hot tile can be saved locally and local images extracted from that copy.

Figure 15:
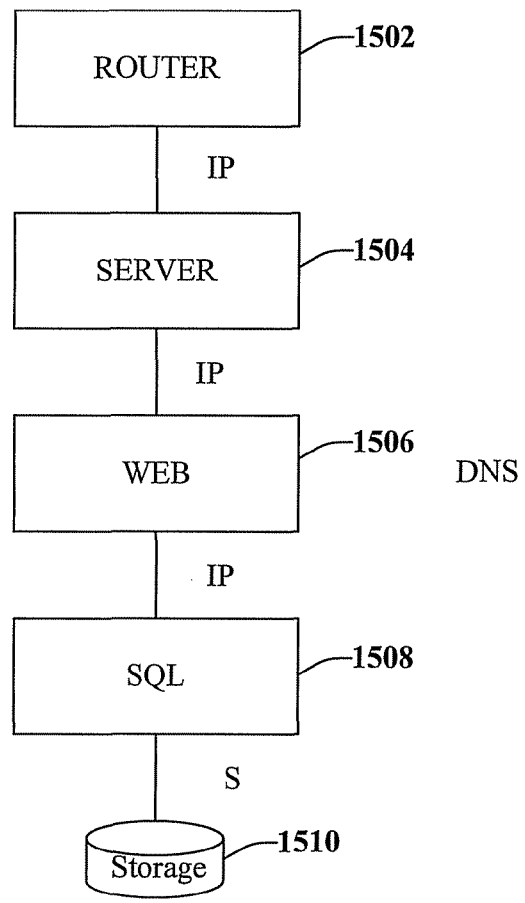
FIG. 15 illustrates an architecture for a conventional system that can be utilized to serve up large images quickly.

Conventional systems can be utilized with the disclosed embodiments and exemplary architecture of such conventional systems is shown in FIG. 15. The data in this architecture must takes a full route through a router 1502, switch 1504, web server 1506, SQL 1508, and storage 1510 associated with IP, DNZ and storage dump. Every piece of data required to populate the network should go through each step in the route. It should be understood that other systems can be employed with the disclosed embodiments.

Figure 16:
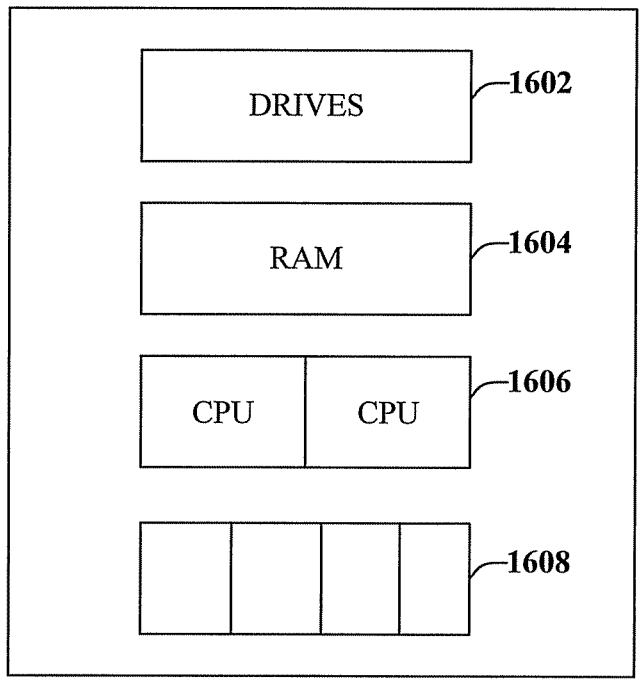
FIG. 16 is an exemplary architecture for a machine that employs the disclosed embodiments.

The subject embodiments can treat each image server as functional elements that hold the right data at the right time. The minimum number of machines that hold the same data should be two machines with each machine having the architecture that can be similar to (or different from) that shown in FIG. 16. Each machine can include a set of drives 1602 (e.g., RAD-1 Drives) and there can be anywhere from one to twenty-four or more drives. The minimum random-access memory (RAM) 1604 should be about 16 GB, although it is possible for the architecture to have less or more memory available than 16 GB. The system also has CPUs, 1606 etc. as illustrated. This is the simplest architecture that a given tile can be dumped into and each tile can be represented as a single file with all associated images (image file).

As discussed previously the tiles associated with a quadrant entry can go with any size resolution. The largest resolution is a 1 (A) and becomes progressing smaller in size, where 7 (G) is much smaller than 2 (B) and much larger than 11 (K). The image files are independent files and can move around independently. The starting level for viewing data might be about a 3 (C) or 4 (D) as a 1 (A) or 2 (B) might be too large.

Figure 17:
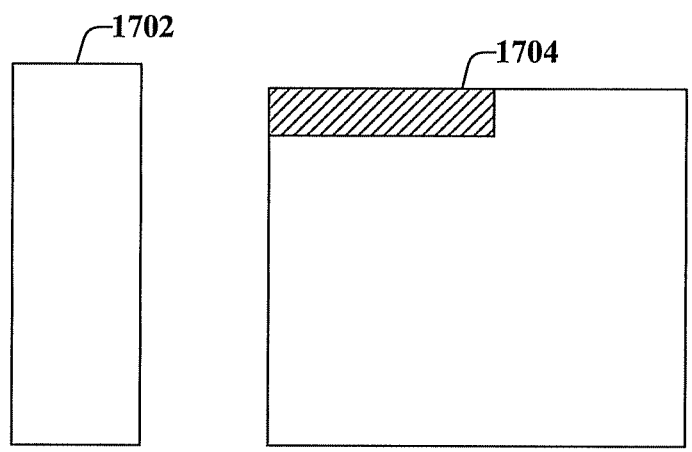
FIG. 17 illustrates an exemplary index file for a data image.

Each data image has an index file, as shown in FIG. 17 that stores the index entry 1702 for a tile 1704, which is just an offset in size. For example, if a user wants to view tile 6 (F), the index file would provide the entry for tile 6 (F). The index files are arranged in one or more logical volumes or logical files and the index is loaded into a module. In this way, the entire drive is memory mapped allowing the system to etch the pieces of the model and when a user requests a tile, the index (memory) id that gives an offset points to the drive, providing as many pages of data as needed to provide the image. The memory that provides the data can also dump the data when it is overlaid with new data. Therefore, from drive to network the data might only be copied once because the system took the data and performed a dump of the data, rather than copying or deleting the data.

Each memory works around the cold, normal, and hot segments or factors as discussed with reference to FIG. 14. If a particular segment gets cold, it is dumped to make room for the hot segments. If a segment is part hot, part normal, or part cold, only the really hot portion (which can be up to about 16 gigabytes or more) remains in memory. If this segment is touched, it will remain there and will not page forward. Thus, as fast as possible memory is moved around and data can be served up very quickly.

There can be a large amount of preprocessing done in preparation for the data to be in the above-described form. The tiles are placed in this format to efficiently serve the data to a plurality of users. The data is not stored as one file because it will be too large, but can be stored at levels 4 (D) and/or 5 (E), for example. Each file has an index version that can actually be generated repeatedly. It should be noted that the index is the metadata of the file. There are copies of the data in many places that can be moved because the file for each tile has its own index and "hotness" is localized on a quadrant boundary. If hot, it will move to as many IP addresses as needed so that the server can serve it up quickly with the index providing pointers and VSS to provide optimized copying.

Figure 18:
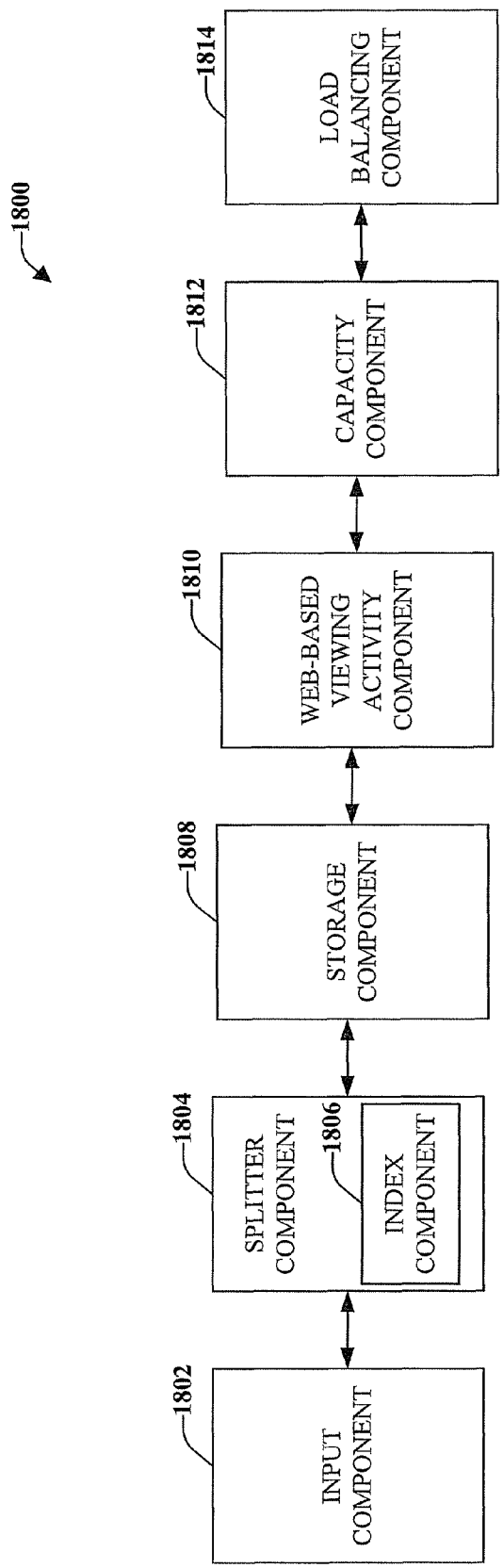
FIG. 18 illustrates a system for receiving, maintaining, and serving up large images expeditiously.

With reference now to FIG. 18, illustrated is a system 1800 for receiving, maintaining, and serving up large images expeditiously. System 1800 includes an input component 1802 that receives image data associated with a specific geographic area. The image data can be input by a plurality of users and/or entities. For example, the image data can be received from a plurality of devices including mobile or wireless devices.

The image data is communicated from the input component 1802 to a splitter component 1804, through, for example, an Internet connection. The splitter component 1804 splits the image data into at least two quadrants. An index component 1806 can be associated with the splitter component 1804 and is configured to provide location identification for each of the at least two quadrants. The quadrants can be stored in a storage component 1808. It should be understood that the quadrants can be distributed among a plurality of storage components 1808.

A web-based viewing activity component 1810 is configured to make a determination as to the level of web-based viewing activity that is associated with a particular geographic location. The web-based viewing activity component 1810 can make a determination based on information retained in the storage component 1808 and base don information received from a capacity component 1812. The capacity component 1812 can be configured to determine an available capacity to render images associated with a particular geographic location or region. The load-balancing component 1814 dynamically redistributes data associated with the one or more images to be rendered as a function of image size and the viewing activity. The viewing activity can be based on the number of requests to view a geographic area or location.

Figure 19:
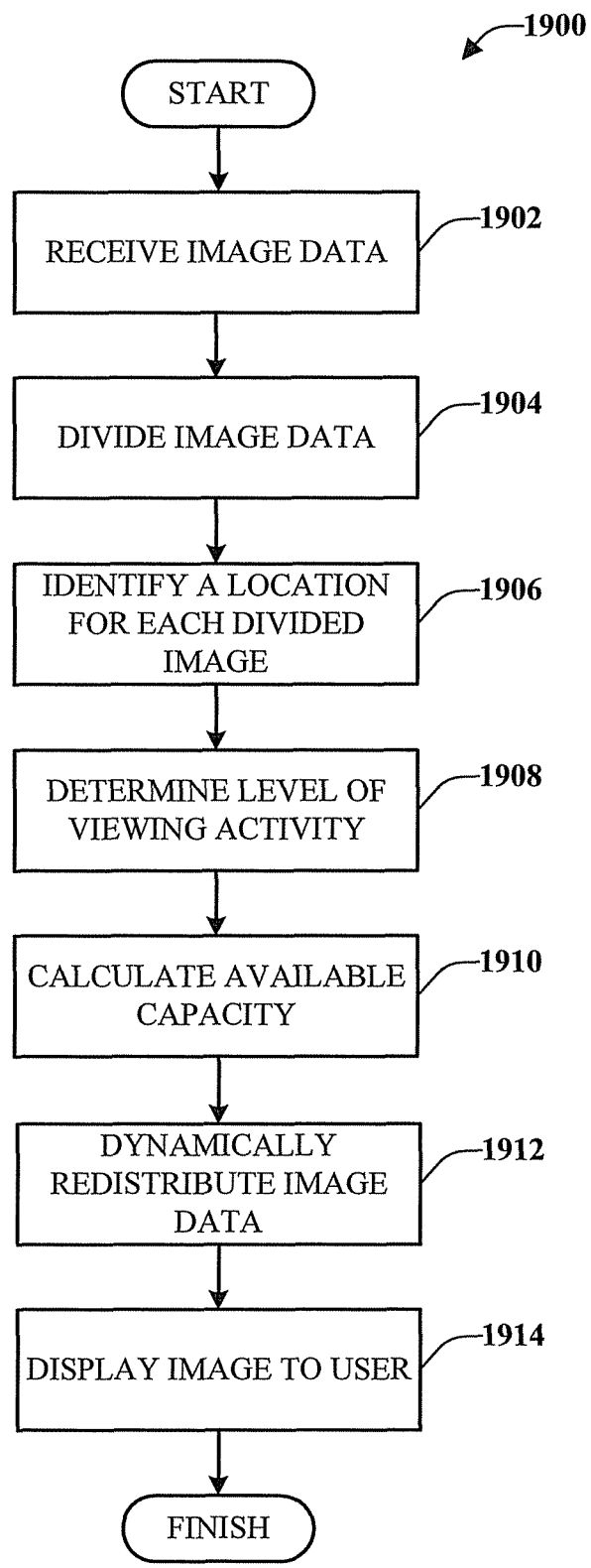
FIG. 19 illustrates a methodology for serving up large images quickly.

With reference now to FIG. 19, illustrated is a methodology 1900 for receiving, maintaining, and serving up large images expeditiously. The method beings at 1902 where image data is received. This image data can be received from a plurality of users and/or entities. The image data is divided or split, at 1904, the render the image in a smaller, easier to store, form. The image data should be split in at least two quadrants. The image data could be split into an unlimited number of quadrants, depending on the size and complexity of each quadrant. Location information is provided for each portion. At 1906, a location identification is provided for each quadrant to ensure that the quadrants can be reassembled when the image data is to be reformed for seamless viewing by a user.

When one or more user(s) requests a quadrant, a determination is made, at 1808, as the level of web-based viewing activity is associated with each particular quadrant or geographic location. If the number of requests received exceeds a threshold level, indicating the area has turned into a hot spot and the available capacity is calculated, at 1910, to determine if the images associated with the particular geographic location can be provided to the plurality of users at substantially the same time. Based on the calculated available capacity, the data associated with the image data is dynamically redistributed to facilitate providing or displaying such images, at 1914, to the plurality of users at substantially the same time.

The disclosed embodiments can be based on a socio-economic model comprising a community of users that populate the layers of the map with specific data. The system allows local people to tailor information into the map given the fact that people who live in the area have a superior knowledge of the area than others. These local people are able to tailor the layer information to achieve more accuracy and detail based on the premise that there are a certain number and type of searches conducted among users. For example, the top 3% of searches are for specific things, such as a particular celebrity, category, hot issues, etc. There are also many small groups each making many small result searches, where this set of persons is much larger than the top three percent. For example, there are billions of groups consisting of ten people who care about a specific term and never care about the other "hot" topics. Geography is similar to this and people who live in a neighborhood are the experts about that neighborhood—where to park, where to eat, where to go at 2 a.m., etc.

There can be a weighting average based upon the local people who contribute to the system. A person can also be monitored for content contributions and if such monitoring proves unfavorable the person might no longer be permitted to post data if a determination is made that such person is providing corrupt, misleading, or malicious data. This determination can be based upon data provided by other users or other appropriate means.

Figure 20:
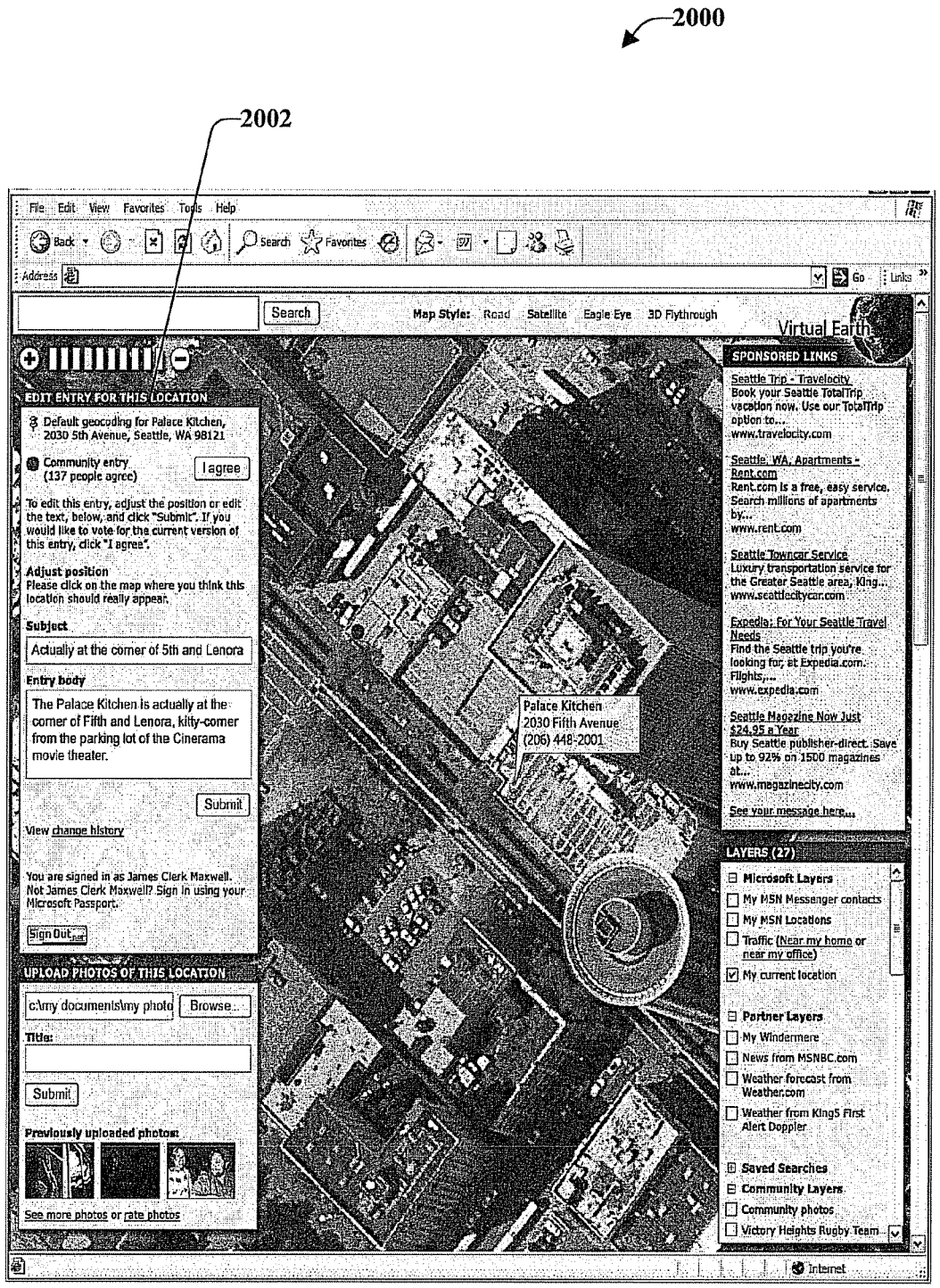
FIG. 20 illustrates an exemplary screen shot of an overlay edit entry that facilitates user entry of comments and other data.
Figure 21:
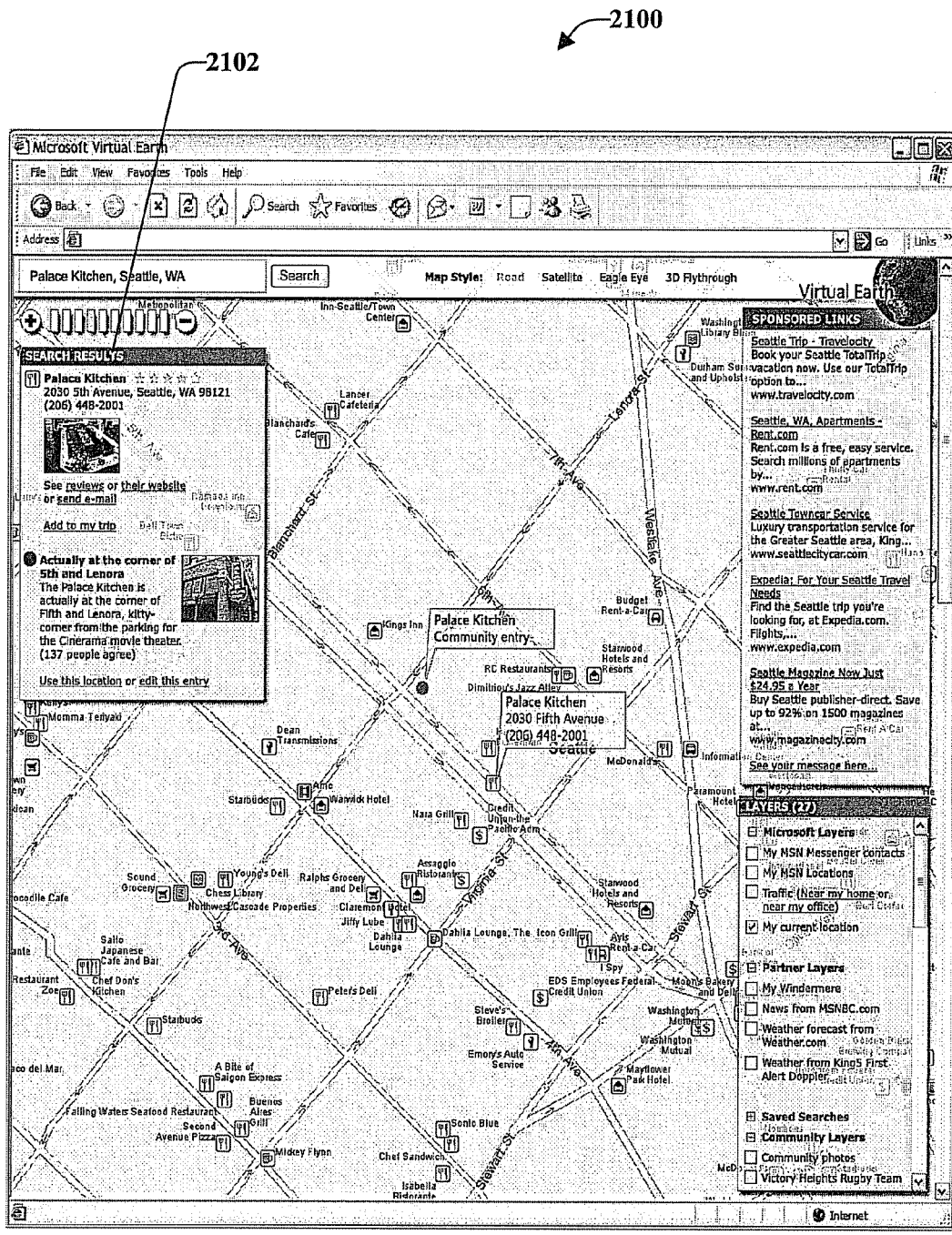
FIG. 21 illustrates an exemplary screen shot of search results.

FIG. 20 illustrates an exemplary screen shot of an overlay edit entry 2100 that facilitates user entry of comments and other data. The controls are translucent and displayed over the map, allowing the map to be viewed under the controls. The controls can include an edit entry 2002 which is an interface though which a user can add information about a particular location, place, thing, etc. The user can submit the edited information, which can be displayed to other users, as shown in FIG. 21, which illustrates an exemplary screen shot of search results 2100. The search results 2102 are provided as a control over the map. In such a manner, other users can see the edit information without the original data being changed. A change can be made to the information if a certain number of users confirm the edit.

Figure 22:
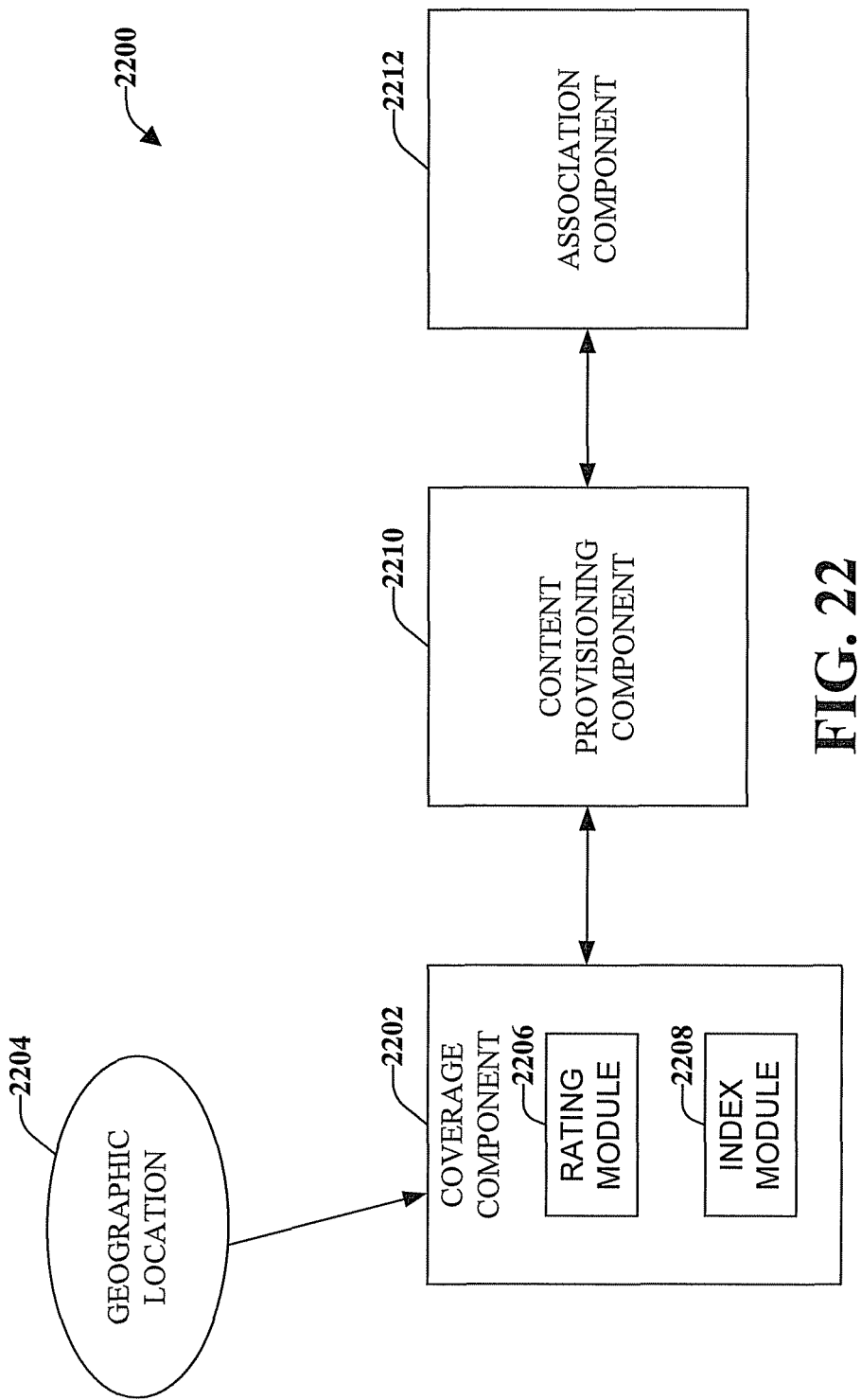
FIG. 22 illustrates a system that facilitates on-line advertising.

With reference now to FIG. 22, illustrated is a system 22000 that facilitates on-line or real-time advertising and can also be referred to as geo-diluted advertising. Geo-diluted advertising is geared toward commercial establishments or others that desire to advertise using the map features and associated geographic area(s), which might be at an extreme the entire world or more focused, such as two city blocks. An advertiser may want to advertise in a specific area and is willing to spend a particular amount of money (e.g., $2.00, $4.00, $10.00, . . . ) per click-through by a user, for example. A coverage component 2202 can be a tool or wizard that creates a layer for the desired geography. The coverage component 2202 receives information relating to advertisement coverage desired by advertisers for a particular geographic location or area 2204. The coverage component 2202 can include a rating module 2206 configured to rate the plurality of advertisers according to a predetermined rating scale. For example, a rating scale may be from 1 to 10 where an advertiser having a rating of 10 has dominance over the area while an advertiser of a 1 rating has a weak advertising position. Advertisers with higher ratings have a greater likelihood of the system displaying their ads for viewing by consumers.

By way of illustration and not limitation, a first advertiser has purchased or "bid on" a particular area, such as a city. A second advertiser, who is a competitor of a first advertiser, can purchase advertising for a much narrower geographic area 2204, such as two city blocks and may be willing to spend a specific amount for advertising, which might be higher than the amount the first advertiser is willing to pay for the same geographic area 2204. The rating module 2206 or tool or wizard can rate the first advertiser and the second advertiser according to the specified areas. In many situations, an advertiser that has a smaller or more narrow or focused area would be rated higher in that area than the advertiser marketing in the wider area. In this way, the localized advertiser would dilute the market allowing such advertiser to compete with larger advertisers.

The diluting occurs when a user zooms into the map or geographic area, or when a user is physically present in an area, then the rating for the smaller advertiser for that moment in time can be greater than the larger advertiser for that area allowing for effective competition. If a user is using a mobile electronic device the map layers can change dynamically while that user is moving around, such as driving, walking, etc. and while physically present in an area.

In an advertising system, similar to system 2200, there can be an index module 2208 that receives bids from advertisers that are bidding in a specific area. The index module 2208 interacts with the coverage component 2202 to rank the advertisers according to the most current bid for each advertiser. Thus, the bidding area for the advertisers can change constantly while allowing the advertisers to immediately see the results of bidding for a specific geographic region or area 2204 and may alter a bid based on the results.

The coverage component 2202 interfaces with a content provisioning component 2210 that provides a plurality of image information sources relating to the particular geographic location. The image information sources include mapping details. The image information is displayed to a user physically present in the geographic area or remotely viewing the area.

The association component 2212 associates an advertiser with at least one of the image information sources that includes mapping information regarding points of interest in a particular geographic region. The association component 2212 facilitates the advertiser employing image information with the associated mapping information. The association component 2212 can further track or monitor the advertisements that are displayed to a plurality of users and can submit the monitored data to the advertiser. This can be accomplished by auto refreshing a display associated with the user device. This facilitates the advertiser compensating the associated source related to the mapping information for use of the image data.

The association component 2212 can monitor a user activity and tailor which advertisement is displayed based on whether the user is physically in the designated geographic location 2204a or remotely visiting the area. The advertisement displayed can be different or tailored for each situation.

Further, the association component 2212 can tailor the advertisement based on a user preference. For example, the user may specify which types of advertisements the user would like and which advertisement types the user prefers not to receive. The association component 2212 can tailor the advertisement displayed to each user based on the user preference and/or the user location.

Figure 23:
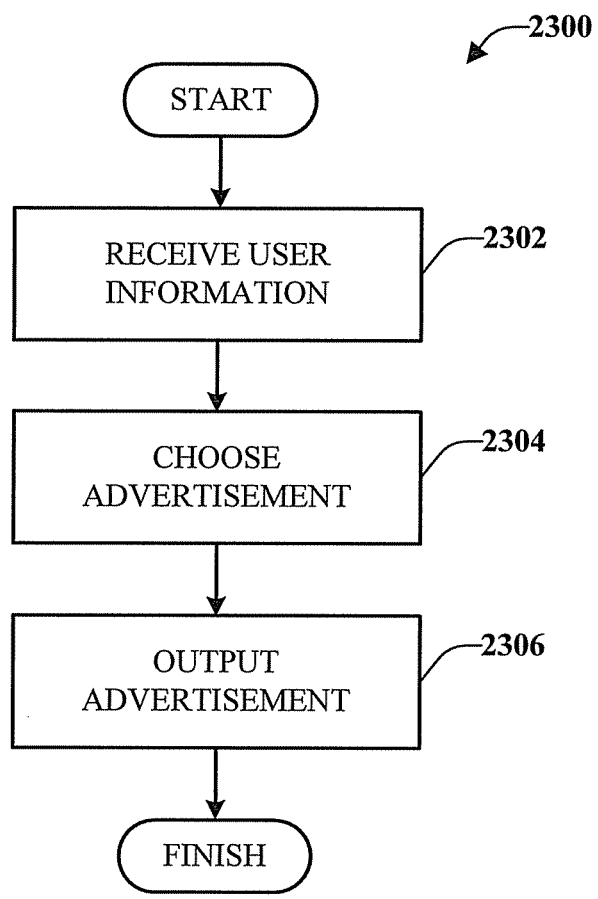
FIG. 23 illustrates a methodology for providing real-time advertising data.

FIG. 23 illustrates a methodology 2300 for providing real-time advertising data. The method starts at 2302 with receipt of user information that can be a user location information. The location of the user can be provided through GPS functionality or other location means. For example, the method can periodically or continually query for user location information while the user is known to be in a particular location, such as a retail shopping mall or outlet. The user information received, at 2302, can in addition or alternatively, relate to a user preference. The user preference can be established by the user through a user interface. The user preference can be determined by other means including obtaining information concerning stores, restaurants, or other places visited by the user.

The method continues, at 2304, when an advertisement is chosen. This advertisement can be chosen based in part on the user location. For example, when a user is within the vicinity of a retail establishment, a choice can be made to send an advertisement from the retail establishment. The method discriminates between a remote user and a user who is physically present in the geographic area and different advertisements can be output based on the user location status. The choice of advertisement can in addition or alternatively be tailored based on the received user preference.

Choosing the advertisement at 2304 can also include receiving from a plurality of advertisers a request to advertise in a particular geographic area. A determination is made as to which advertiser has priority in the particular geographic area. The priority can be set by determining a coverage area and ranking the advertiser based in part on the coverage area. The advertisement of the advertiser that has priority is output if it matches the user location information. Ranking can also be based on association diluting that is a product of the user's location The advertisement chosen is output to the user at 2306. For example, a user walking in a mall can receive a geo-coupon for 20% off in a store for the next 20 minutes. If the user leaves the area (or if 20 minutes passes) the coupon automatically expires. The disclosed systems and methods provide better targeting of ads with buyers specifying regions that they want their ads to display or when someone is searching for a particular event, place, within a predefined geographic area.

The advertisement output at 2306 can be changed based on a monitored user location. A user display can be automatically updated or refreshed if a determination is made that the advertisement displayed to the user should be changed. In addition, if the user leaves the area, the advertisement can be automatically removed from the user display, through a refresh process.

Figure 24:
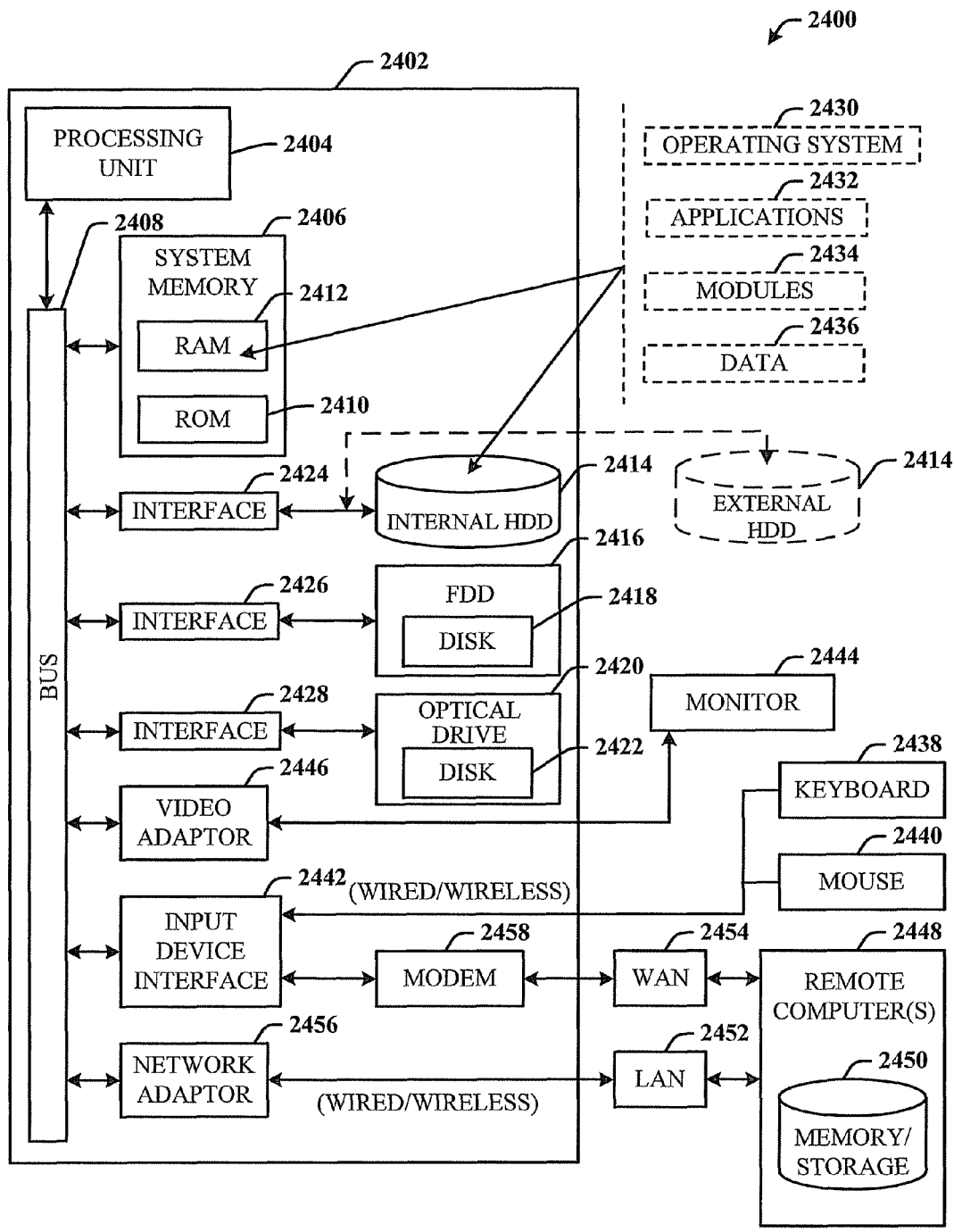
FIG. 24 illustrates a block diagram of a computer operable to execute the disclosed embodiments.

Referring now to FIG. 24, there is illustrated a block diagram of a computer operable to execute the disclosed architecture. In order to provide additional context for various aspects disclosed herein, FIG. 24 and the following discussion are intended to provide a brief, general description of a suitable computing environment 2400 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 24, the exemplary environment 2400 for implementing various aspects includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi-processor architectures may also be employed as the processing unit 2404.

The system bus 2408 can be any of several types of bus structure that may further interconnect to a memory bus (with or without a memory controller), a peripheral bus, and a local bus using any of a variety of commercially available bus architectures. The system memory 2406 includes read-only memory (ROM) 2410 and random access memory (RAM) 2412. A basic input/output system (BIOS) is stored in a non-volatile memory 2410 such as ROM, EPROM, EEPROM, which BIOS contains the basic routines that help to transfer information between elements within the computer 2402, such as during start-up. The RAM 2412 can also include a high-speed RAM such as static RAM for caching data.

The computer 2402 further includes an internal hard disk drive (HDD) 2414 (e.g., EIDE, SATA), which internal hard disk drive 2414 may also be configured for external use in a suitable chassis (not shown), a magnetic floppy disk drive (FDD) 2416, (e.g., to read from or write to a removable diskette 2418) and an optical disk drive 2420, (e.g., reading a CD-ROM disk 2422 or, to read from or write to other high capacity optical media such as the DVD). The hard disk drive 2414, magnetic disk drive 2416 and optical disk drive 2420 can be connected to the system bus 2408 by a hard disk drive interface 2424, a magnetic disk drive interface 2426 and an optical drive interface 2428, respectively. The interface 2424 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 2402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. It is appreciated that the various embodiments can be implemented with various commercially available operating systems or combinations of operating systems.

A user can enter commands and information into the computer 2402 through one or more wired/wireless input devices, e.g., a keyboard 2438 and a pointing device, such as a mouse 2440. Other input devices (not shown) may include a microphone, an IR remote control, a joystick, a game pad, a stylus pen, touch screen, or the like. These and other input devices are often connected to the processing unit 2404 through an input device interface 2442 that is coupled to the system bus 2408, but can be connected by other interfaces, such as a parallel port, an IEEE 1394 serial port, a game port, a USB port, an IR interface, etc.

A monitor 2444 or other type of display device is also connected to the system bus 2408 via an interface, such as a video adapter 2446. In addition to the monitor 2444, a computer typically includes other peripheral output devices (not shown), such as speakers, printers, etc.

The computer 2402 may operate in a networked environment using logical connections via wired and/or wireless communications to one or more remote computers, such as a remote computer(s) 2448. The remote computer(s) 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wired/wireless connectivity to a local area network (LAN) 2452 and/or larger networks, e.g., a wide area network (WAN) 2454. Such LAN and WAN networking environments are commonplace in offices and companies, and facilitate enterprise-wide computer networks, such as intranets, all of which may connect to a global communications network, e.g., the Internet.

When used in a LAN networking environment, the computer 2402 is connected to the local network 2452 through a wired and/or wireless communication network interface or adapter 2456. The adaptor 2456 may facilitate wired or wireless communication to the LAN 2452, which may also include a wireless access point disposed thereon for communicating with the wireless adaptor 2456.

When used in a WAN networking environment, the computer 2402 can include a modem 2458, or is connected to a communications server on the WAN 2454, or has other means for establishing communications over the WAN 2454, such as by way of the Internet. The modem 2458, which can be internal or external and a wired or wireless device, is connected to the system bus 2408 via the serial port interface 2442. In a networked environment, program modules depicted relative to the computer 2402, or portions thereof, can be stored in the remote memory/storage device 2450. It will be appreciated that the network connections shown are exemplary and other means of establishing a communications link between the computers can be used.

The computer 2402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 25:
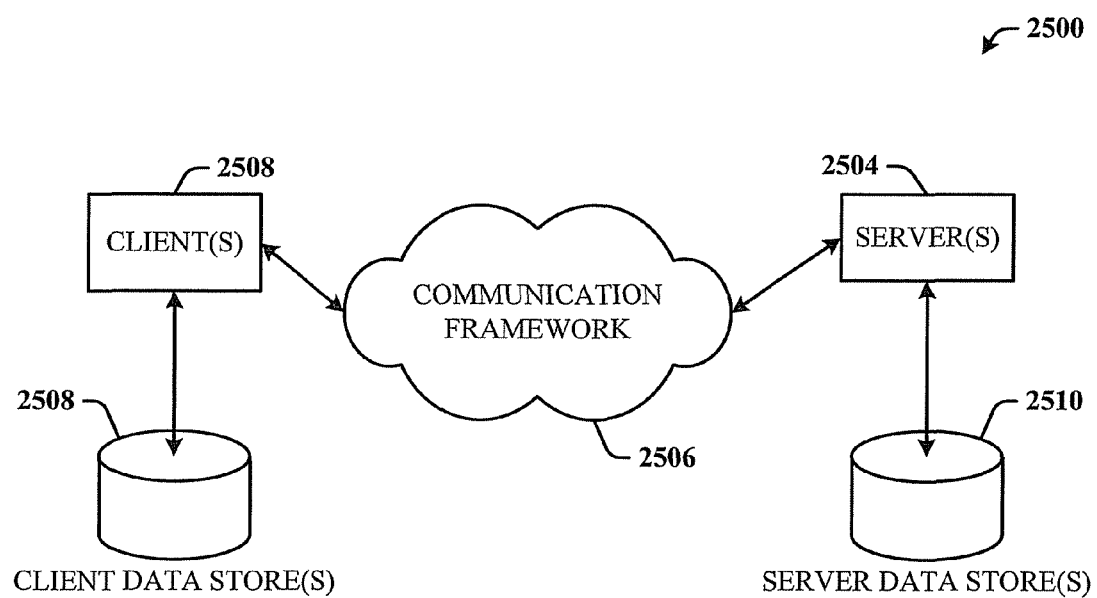
FIG. 25 illustrates a schematic block diagram of an exemplary computing environment operable to execute the disclosed embodiments.

Referring now to FIG. 25, there is illustrated a schematic block diagram of an exemplary computing environment 2500 in accordance with the various embodiments. The system 2500 includes one or more client(s) 2502. The client(s) 2502 can be hardware and/or software (e.g., threads, processes, computing devices). The client(s) 2502 can house cookie(s) and/or associated contextual information by employing the various embodiments, for example.

The system 2500 also includes one or more server(s) 2504. The server(s) 2504 can also be hardware and/or software (e.g., threads, processes, computing devices). The servers 2504 can house threads to perform transformations by employing the various embodiments, for example. One possible communication between a client 2502 and a server 2504 can be in the form of a data packet adapted to be transmitted between two or more computer processes. The data packet may include a cookie and/or associated contextual information, for example. The system 2500 includes a communication framework 2506 (e.g., a global communication network such as the Internet) that can be employed to facilitate communications between the client(s) 2502 and the server(s) 2504.

Communications can be facilitated via a wired (including optical fiber) and/or wireless technology. The client(s) 2502 are operatively connected to one or more client data store(s) 2508 that can be employed to store information local to the client(s) 2502 (e.g., cookie(s) and/or associated contextual information). Similarly, the server(s) 2504 are operatively connected to one or more server data store(s) 2510 that can be employed to store information local to the servers 2504.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for generating a map, comprising:
   receiving, from a first user, location data for the first user during a first time interval;
   receiving, from the first user, additional data, wherein the additional data is received during the first time interval;
   based on the location data for the first user and the additional data from the first user being received during the first time interval, associating the additional data from the first user with the location data for the first user;
   receiving, from a second user, location data for the second user during a second time interval;
   receiving, from the second user, additional data, wherein the additional data from the second user is received during the second time interval;
   based on the location data for the second user and the additional data from the second user being received during the second time interval, associating the additional data from the second user with the location data for the second user;

applying at least one visual representation of the additional data received from the first and second users to the map; and displaying the map.

2. The method of claim 1, wherein the additional data received from the first and second users comprises at least one of the group consisting of: traffic information, construction information, and annotated information.

3. The method of claim 1, wherein the additional data for the first and second users is applied and the map is displayed within the first time interval.

4. The method of claim 1, wherein a first rating is associated with the first user and a second rating is associated with the second user.

5. The method of claim 1, further comprising tracking the location of the first and second users.

6. The method of claim 5, wherein the receiving location data from the first user is based on the tracking of the location of the first user, and wherein receiving location data from the second user is based on the tracking of the location of the second user.

7. The method of claim 1, further comprising applying a visual representation of predicted future information to the map, wherein the predicted future information is based on at least one of the group consisting of: the location data received from the first user and the additional data received from the first user.

8. The method of claim 1, further comprising:
receiving a search request from the first user for entities nearby the first user;
providing results for the search request based on the additional data received from the second user.

9. The method of claim 1, further comprising displaying the location of the first and second users on the map.

10. The method of claim 1, wherein the map with the at least one visual representation is displayed only to users located within a predetermined distance from the first and second users.

11. A computer-readable storage device containing machine readable instructions that, when executed by a processor, cause the processor to perform a method, the method comprising:
receiving, from a first user, location data for the first user during a first time interval;
receiving, from the first user, additional data, wherein the additional data is received during the first time interval;
based on the location data for the first user and the additional data from the first user being received during the first time interval, associating the additional data from the first user with the location data for the first user;
receiving, from a second user, location data for the second user during a second time interval;
receiving, from the second user, additional data, wherein the additional data from the second user is received during the second interval;
based on the location data for the second user and the additional data from the second user being received during the second time interval, associating the additional data from the second user with the location data for the second user;
applying at least one visual representation of the additional data received from the first and second users to a map; and
displaying the map.

12. The computer-readable storage device of claim 11, wherein the additional data received from the first and second users comprises at least one of the group consisting of: traffic information, construction information, and annotated information.

13. The computer-readable storage device of claim 11, wherein the additional data received from the first user and the second user is applied and the map is displayed within the first time interval.

14. The computer-readable storage device of claim 11, wherein a first rating is associated with the first user and a second rating is associated with the second user.

15. The computer-readable storage device of claim 11, wherein the method further comprises tracking the location of the first and second users.

16. The computer-readable storage device of claim 15, wherein the receiving location data from the first user is based on the tracking of the location of the first user, and wherein the receiving location data from the second user is based on the tracking of the location of the second user.

17. The computer-readable storage device of claim 11, wherein the method further comprises applying a visual representation of predicted future information to the map, wherein the predicted future information is based on at least one of the group consisting of: the location data for the first user and the additional data received from the first user.

18. The computer-readable storage device of claim 11, wherein the method further comprises:
receiving a search request from the first user for entities nearby the first user;
providing results for the search request based on the additional data received from the second user.

19. The computer-readable storage device of claim 11, wherein the method further comprises displaying the location of the first and second users on the map.

20. A system for generating a map, the system comprising:
a processor; and
a memory that comprises a plurality of components that are executed by the processor, the plurality of the components comprising:
a receiver component, wherein the receiver component:
receives, from a first user, location data for the first user at a first time;
receives, from the first user, additional data, wherein the additional data is received at the first time;
based on the location data for the first user and the additional data from the first user being received at the first time, associating the additional data from the first user with the location data for the first user;
receives, from a second user, location data for the second user at a second time; and
receives, from the second user, additional data, wherein the additional data received from the second user at the second time;
associating data such that the additional data from the second user with the location data for the second user; and
a stitching component, wherein the stitching component applies at least one visual representation of the additional data received from the first and second user to the map; and
a rendering component that outputs the map.

* * * * *